United States Patent
Wong et al.

(10) Patent No.: US 11,044,597 B2
(45) Date of Patent: Jun. 22, 2021

(54) APPARATUS AND METHODS FOR REGISTRATION AND OPERATION IN WIRELESS NETWORKS

(71) Applicant: Charter Communications Operating, LLC, St. Louis, MO (US)

(72) Inventors: Curt Wong, St. Louis, MO (US);
Maulik Vaidya, St. Louis, MO (US);
Yildirim Sahin, St. Louis, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 39 days.

(21) Appl. No.: 16/251,999

(22) Filed: Jan. 18, 2019

(65) Prior Publication Data
US 2020/0053545 A1 Feb. 13, 2020

Related U.S. Application Data

(60) Provisional application No. 62/715,562, filed on Aug. 7, 2018.

(51) Int. Cl.
*H04W 8/08* (2009.01)
*H04W 8/04* (2009.01)
(Continued)

(52) U.S. Cl.
CPC .............. *H04W 8/08* (2013.01); *H04W 8/04* (2013.01); *H04W 60/00* (2013.01); *H04W 76/11* (2018.02); *H04W 76/27* (2018.02); *H04W 84/042* (2013.01)

(58) Field of Classification Search
CPC ....... H04W 84/042; H04W 8/08; H04W 8/04; H04W 76/11; H04W 76/27; H04W 60/00
See application file for complete search history.

(56) References Cited

U.S. PATENT DOCUMENTS 6,542,739 B1 4/2003 Garner
8,265,028 B2 9/2012 Davies et al.
(Continued)

FOREIGN PATENT DOCUMENTS

| KR | 20160097917 A | 8/2016 |
| WO | WO-2004045125 A2 | 5/2004 |
| WO | WO-2018131488 A1 | 7/2018 |

OTHER PUBLICATIONS

3GPP TS 38.473 V15.A.A (Apr. 2018)"3rd Generation Partnership Project; Technical Specification Group Radio Access Network," TS 38.473 (v15.0.0), Dec. 2017, NG-RAN, F1 application protocol (F1AP), Release 15, 90 pages.
(Continued)

*Primary Examiner* — Rasheed Gidado
(74) *Attorney, Agent, or Firm* — Gazdzinski & Associates, PC

(57) ABSTRACT

Apparatus and methods for registration of e.g., mobile devices in one or more wireless networks. In one embodiment, the apparatus and methods provide enhanced wireless services which enable operation of a given mobile device (e.g., a 3GPP-compliant UE) within two or more mobile networks (e.g., PLMNs) of respective different operators. In one implementation, the UE operates in dual-registration mode or DRM to allow different interworking between the two networks, and includes independent registration capability to 5GC and EPC infrastructure simultaneously. Accordingly, the UE is provided umbrella 4G/4.5G coverage over one or more small-cell 5G networks, with respective independent operators of each. Enhanced DRM-UEe capability as described herein advantageously allows for service provision (e.g., voice service) and interworking between the macro and small-cell layers of the system without compli-
(Continued)

cated network configuration requirements between the two operating networks.

19 Claims, 13 Drawing Sheets

(51) Int. Cl.
*H04W 60/00* (2009.01)
*H04W 76/11* (2018.01)
*H04W 76/27* (2018.01)
*H04W 84/04* (2009.01)

(56) References Cited

U.S. PATENT DOCUMENTS

| | | | | |
|---|---|---|---|---|
| 8,599,797 | B2* | 12/2013 | Pelkonen | H04W 36/0066 |
| | | | | 370/332 |
| 8,724,588 | B2* | 5/2014 | Li | H04W 36/0055 |
| | | | | 370/331 |
| 8,880,071 | B2 | 11/2014 | Taaghol et al. | |
| 8,997,136 | B2 | 3/2015 | Brooks | |
| 9,001,789 | B2 | 4/2015 | Hosobe | |
| 9,596,593 | B2* | 3/2017 | Li | H04W 8/02 |
| 9,706,512 | B2* | 7/2017 | Suh | G06K 17/00 |
| 9,948,349 | B2 | 4/2018 | Malach | |
| 10,009,431 | B2* | 6/2018 | Holtmanns | H04L 63/306 |
| 10,375,629 | B2* | 8/2019 | Zhang | H04W 8/20 |
| 10,506,499 | B2* | 12/2019 | Keller | H04W 8/24 |
| 2009/0176490 | A1 | 7/2009 | Kazmi et al. | |
| 2010/0178912 | A1 | 7/2010 | Gunnarsson et al. | |
| 2011/0117917 | A1 | 5/2011 | Gresset et al. | |
| 2011/0207456 | A1 | 8/2011 | Radulescu et al. | |
| 2012/0224563 | A1* | 9/2012 | Zisimopoulos | H04W 36/14 |
| | | | | 370/331 |
| 2012/0246255 | A1* | 9/2012 | Walker | H04W 60/005 |
| | | | | 709/208 |
| 2012/0275315 | A1 | 11/2012 | Schlangen et al. | |
| 2013/0178225 | A1* | 7/2013 | Xing | H04W 16/14 |
| | | | | 455/454 |
| 2013/0252616 | A1 | 9/2013 | Murakami | |
| 2014/0370895 | A1 | 12/2014 | Pandey et al. | |
| 2015/0201088 | A1* | 7/2015 | Wu | H04M 15/43 |
| | | | | 455/406 |
| 2015/0365178 | A1 | 12/2015 | Maattanen et al. | |
| 2016/0073344 | A1 | 3/2016 | Vutukuri et al. | |
| 2016/0094421 | A1 | 3/2016 | Bali et al. | |
| 2016/0128072 | A1 | 5/2016 | Rajagopal et al. | |
| 2017/0208488 | A1* | 7/2017 | Hwang | H04W 76/34 |
| 2018/0063813 | A1* | 3/2018 | Gupta | H04W 60/005 |
| 2018/0092142 | A1* | 3/2018 | Han | H04W 36/38 |
| 2018/0098245 | A1 | 4/2018 | Livanos et al. | |
| 2018/0338277 | A1 | 11/2018 | Byun et al. | |
| 2019/0053193 | A1 | 2/2019 | Park et al. | |
| 2019/0075023 | A1 | 3/2019 | Sirotkin | |
| 2019/0082501 | A1* | 3/2019 | Vesely | H04W 76/15 |
| 2019/0124696 | A1 | 4/2019 | Islam et al. | |
| 2019/0208380 | A1* | 7/2019 | Shi | H04M 15/66 |
| 2019/0245740 | A1 | 8/2019 | Kachhla | |
| 2019/0253944 | A1* | 8/2019 | Kim | H04W 36/0085 |
| 2019/0289470 | A1 | 9/2019 | Vaidya | |
| 2019/0357199 | A1* | 11/2019 | Ali | H04W 48/16 |

OTHER PUBLICATIONS

3GPP TS 23.401, Section 5.3.2.
3GPP TS 23.502, Section 4.2.2.2.
"Wi-Fi Peer-to-Peer (P2P) Specification", copyright 2014, Wi-Fi Alliance.
IEEE 802.11 standard, 1997, www.ieeexplore.ieee.org/document/654779.

* cited by examiner

APPARATUS AND METHODS FOR REGISTRATION AND OPERATION IN WIRELESS NETWORKS

PRIORITY

This application claims priority to U.S. Provisional Patent Application Ser. No. 62/715,562 filed Aug. 7, 2018 entitled "APPARATUS AND METHODS FOR REGISTRATION AND OPERATION IN WIRELESS NETWORKS," which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to activation or selection of one or more cells within one or more RANs (Radio Area Networks) of a radio network utilizing licensed and/or unlicensed spectrum.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |

TABLE 2-continued

| Frequency range | Type | Center frequency | Availability | Licensed users |
|---|---|---|---|---|
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, small cells, etc. that are within wireless range.

5G New Radio (NR) and NG-RAN (Next Generation Radio Area Network)

NG-RAN or "NextGen RAN (Radio Area Network)" is part of the 3GPP "5G" next generation radio system. 3GPP has specified Release 15 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core, also called "5GC").

The NG-RAN (5G) System architecture is designed to support data connectivity and services offering with higher throughput and lower latency. FIG. 1 shows the 5G architecture 100 as defined in 3GPP TS 23.501 (FIG. 4.2.3-1 thereof).

An existing 3GPP LTE/LTE-A/EPC (i.e., 4G or 4.5G system) cannot be updated to support 5G; hence, 3GPP has also defined interworking procedures between such 4G/4.5G and 5G systems. FIG. 2a shows the architecture 200 for interworking between 5GS and EPC/E-UTRAN as defined in TS 23.501 (FIG. 4.3.1-1 thereof), specifically the non-roaming architecture for interworking between the 5GS and the EPC/E-UTRAN. Two different RAN technologies are supported; i.e., E-UTRAN (4G/4.5G) 202, and 5G (NG-RAN) 204.

FIG. 2b (TS 23.501 FIG. 4.3.2-2) similarly illustrates the home-routed roaming architecture 220 for interworking between the 5GS and the EPC/E-UTRAN. The dashed line in FIG. 2b delineates the logic separation between components of the Home PLMN (HPLMN) 222 and the Visited PLMN (VPLMN) 224 for a given UE.

FIG. 3 shows an exemplary service-based architecture 300 under the 5G standards; specifically, for a roaming scenario with local breakout (i.e. the roaming UE interfaces the Data Network (DN) in the visited network (VPLMN) 224, and the UE's HPLMN 222 supports operation with various types of data including (i) subscription information (UDM), (ii) subscriber authentication (AUSF) data, and (ii) UE-specific policies (PCF). Other functions such as network slice selection (NSSF), network access control and mobility management (AMF), data service management (SMF) and application functions (AF) are provided by the VPLMN 224 which the UE is visiting.

In the local breakout scenario of FIG. 3, a given UE typically receives data services of a PLMN completely from the serving (visited) operator's administrative domain. Alternatively, so-called home-routed data services, which provide network functions at least partly from the home operator's administrative domain, with the UE interfacing with the DN in the HPLMN (not shown) versus the DN 302 of the visited network (VPLMN) 224.

One service example of using the aforementioned interworking feature between the 5GS and the EPC/E-UTRAN is that a hypothetical voice call can be handled in the EPS (Evolved Packet System) or 4G/4.5G side by using redirection or handover features from the NG-RAN/5G side.

Notably, the extant 5GS and EPS interworking approach assumes that same PLMN operator operates on both sides of the architecture of FIG. 2a i.e., E-UTRAN (4G/4.5G) 202, and 5G (NG-RAN) 204. This means the PLMN ID (i.e., PLMN or Public Land Mobile Network Identity which includes Mobile Country Code (MCC) and Mobile Network Code (MNC)) being broadcasted by each side i.e., E-UTRAN (4G/4.5G) 202, and 5G (NG-RAN) 204, are related to each other as EPLMNs (Equivalent PLMNs). This means that they are operated by the same mobile network operator (MNO).

The 5G specifications (including TS 23.501) also define two types of UE registration modes: (i) single-registration mode, and (ii) dual-registration mode. As set forth in TS 23.501 (section 5.17.2.1), in single-registration mode, the UE has only one active MM (mobility management) state—either an RM state in 5GC (5G Core) or an EMM state in EPC—and it is either in 5GC NAS mode or in EPC NAS mode (when connected to 5GC or EPC, respectively). The UE maintains a single coordinated registration for both 5GC and EPC. Hence, the UE maps the EPS-GUTI (Globally Unique Temporary Identity) to 5G GUTI during mobility between EPC and 5GC, and vice versa (referencing Annex B).

As further set forth in TS 23.501 (section 5.17.2.1), the UE also keeps the native 5G-GUTI and the native 5G security context when moving from 5GC to EPC (so as to enable re-use of a previously established 5G security context when returning to 5GC).

Conversely, regarding dual-registration mode or "DRM," TS 23.501 (section 5.17.2.1) states that the UE processes independent registrations for 5GC and EPC using separate RRC connections, and that the UE maintains both (i) a 5G-GUTI, and (ii) an EPS-GUTI, independent of one another. In this DRM mode, the UE provides its native 5G-GUTI, if previously allocated by 5GC, for registrations towards the 5GC, and it provides its native EPS-GUTI, if previously allocated by EPC (Evolved Packet Core), for Attach/TAU towards the EPC. In this DRM mode, the UE may be registered: (i) to the 5GC only, (ii) to the EPC only, or (iii) to both the 5GC and EPC.

However, as referenced above, extant 3GPP 5G standards, while providing compatibility between the heterogeneous 4G/4.5G and 5G technologies, do not permit association of a given UE with more than one PLMN at a time. Specifically, in the context of the aforementioned VPLMN and HPLMN (see FIG. 2b), while a UE can maintain an RRC connection with the 4G/4.5G E-UTRAN and the 5G NG-RAN simultaneously, such connections must exist only within one PLMN (e.g., the VPLMN shown in FIG. 2b), due at least in part to the UE maintaining only a single network credential in, e.g., its Universal Subscriber Identity Module or USIM. This requirement places a significant restriction on the operation and architecture of the involved networks, since inter alia both the 4G/4.5G E-UTRAN/EPC (and eNB) and 5G RAN/5GC in this example must be maintained by the same operator, or at very least be in data communication with one another and coordinated via the N26 MME/AMF interface for single-registration mode UE.

In reality, many situations may exist where the 5G RAN operation/coverage/configuration is specified by one network operator or entity, and the EPC/E-UTRAN operation/coverage/configuration specified by another. These entities may not have any mechanism for coordination or communication (other than those explicitly specified as required by 3GPP). Stated differently, extant 3GPP 5G RAN standards do not anticipate the situation where the EPC/E-UTRAN and 5G RAN are split across two or more operator's networks, but rather only contemplate the situation where (i) both RANs are of a common operator, and (ii) only prescribed communication between the two PLMNs is used. As such, a hypothetical UE that could be simultaneously connected to the two different PLMNs would require the support of dual-SIMs, in effect making the UE operate as two logical UEs "glued together."

Similarly, on the network side, two HSS (Home Subscriber Service) entities would be required (i.e., one HSS per PLMN) and both PLMNs would be operated independently with each other. Since the UE practically could only be a subscriber to one operator, managing one subscription via two distinct PLMNs requires additional operational expenditure (OPEX); i.e., to maintain communication and coordination between the two networks, since specialized communication channels and infrastructure would necessarily need to be established for such purposes.

Accordingly, improved methods and apparatus are need to enable, inter alia, "splitting" of the RANs (e.g., 4G/4.5G and 5G) across respective different networks (and network operators), such as where one RAN is associated with a first PLMN, and the second RAN is associated with another, different PLMN.

SUMMARY

The present disclosure addresses the foregoing needs by providing, inter alia, methods and apparatus for providing multi-network registration and operation (including service/application support) for wireless mobile devices.

In one aspect, a computerized mobile device configured for use within multiple mobile network environments is disclosed. In one embodiment, the computerized mobile device includes: digital processor apparatus; first wireless interface apparatus in data communication with the digital processor apparatus and configured for wireless communication with a first radio area network (RAN) utilizing a first wireless access technology; second wireless interface apparatus in data communication with the digital processor apparatus and configured for wireless communication with a second RAN utilizing a second wireless access technology; and storage apparatus in data communication with the digital processor apparatus and comprising a storage medium, the storage medium comprising at least one computer program.

In one variant, the at least one computer program is, configured to, when executed on the digital processor apparatus: establish data communication with a first network management entity associated with the first RAN, the first network management entity associated with a first network operator and a first mobile network; and establish data communication with a second network management entity associated with the second RAN, the second network management entity associated with a second network operator and a second mobile network.

In one implementation, the first wireless access technology comprises a 3GPP Long Term Evolution (LTE)-based technology, and the second wireless access technology comprises a 3GPP New Radio (5G-NR)-based technology. The first mobile network comprises for example a home public land mobile network (HPLMN) of the computerized mobile device, and the second mobile network comprises a public land mobile network (PLMN) which the computerized mobile device is visiting.

In another variant, the at least one computer program is configured to, when executed by the digital processor apparatus, perform the establishment of the data communication with the first network management entity associated with the first RAN and the establishment of the data communication with the second network management entity associated with the second RAN contemporaneously such that at least a portion of the data communication between the computerized mobile device and the first network management entity temporally overlaps with at least a portion of the data communication between the computerized mobile device and the second network management entity.

In one implementation, the contemporaneous establishment of the data communication with the first network management entity associated with the first RAN and the data communication with the second network management entity associated with the second RAN includes maintaining at least (i) a first RRC (Radio Resource Control) connection for the data communication with the first network management entity and (ii) a second RRC (Radio Resource Control) connection for the data communication with the second network management entity.

In another variant, the computerized mobile device further includes: the subscriber identity module logic in data communication with the data processor apparatus, the subscriber identity module configured to provide data enabling the establishment of the data communication with the first network management entity; and the same subscriber identity module configured to provide data enabling the establishment of the data communication with the second network management entity. In one implementation, the subscriber identity module logic are part of a common Universal Subscriber Identity Module (USIM).

In another variant, the data enabling the establishment of the data communication with the first network management entity includes data relating to a first land mobile network (LMN), and the data enabling the establishment of the data communication with the second network management entity includes data relating to a second land mobile network (LMN).

In a further variant, the computerized mobile device includes a user equipment (UE); the first land mobile network (LMN) includes a visited public land mobile network (VPLMN) for the UE; and the second land mobile network (LMN) includes a home public land mobile network (HPLMN) for the UE.

In yet another variant, the first network management entity and the second network management entity are not affiliated or federated.

In still another variant, the first wireless access technology includes a 3GPP Long Term Evolution (LTE)-based technology; the second wireless access technology includes a 3GPP New Radio (5G-NR)-based technology; and the computerized mobile device is further configured to support DRM (Dual Registration Mode) operation.

In another aspect of the disclosure, an enhanced UE (user equipment) apparatus, or $UE_e$, for use within a wireless network is disclosed. In one embodiment, the $UE_e$ includes both 4G/4.5G E-UTRAN-based and 5G NR-based wireless interfaces and associated protocol stacks so as to support both: (i) DRM (Dual Registration Mode) operation, and (ii) multi-network (e.g., multi-PLMN) operation.

In another aspect of the disclosure, network apparatus for use within a wireless network is disclosed. In one embodiment, the network apparatus includes an enhanced MME (Mobility Management Entity) or $MME_e$, and is configured to at least recognize prescribed 5G-related network migration or transition signals from the enhanced UE ($UE_e$) so as to enable setup of a multi-network operation environment.

In one variant, the network apparatus includes an MME (Mobility Management Entity) process configured to at least recognize one or more prescribed 3GPP 5G NR (New Radio)-based network migration or transition signals generated from one or more 3GPP 5G NR compliant UE (user equipment) to enable simultaneous operation of the UE associated with first and second distinct land mobile networks (LMNs).

In one implementation, the network apparatus is configured to utilize the 3GPP 5G NR (New Radio)-based network migration or transition signals received from the UE to cause non-inclusion of indicator data in a transmission to a network management entity process associated with the first LMN. For example, the network apparatus may include a 3GPP Long Term Evolution (LTE) Mobility Management Entity (MME) process, and the network management process may include a 3GPP compliant HSS+UDM (Home Subscriber Service and User Data Management) entity.

In another variant, the non-inclusion of indicator data in a transmission to the network management entity process associated with the first LMN results in the network management entity process not cancelling an extant registration of the UE with another 5G NR entity. In one implementation of this variant, the network apparatus includes a 3GPP Long Term Evolution (LTE) Mobility Management Entity (MME) process, the network management process includes a 3GPP compliant HSS+UDM (Home Subscriber Service and User Data Management) entity, and the another 5G NR entity comprises an AMF (Access and Mobility Management Function).

In another aspect of the disclosure, network apparatus for use within a wireless network is disclosed. In one embodiment, the network apparatus includes an enhanced HSS+UDM (Home Subscriber Service and User Data Management) entity, or $HSS+UDM_e$, and is configured to at least to be aware of a second PLMN (or SPLMN) registering the $UE_e$, thereby allowing the $HSS+UDM_e$ to maintain registration within the 5GS (and thereby enable setup of a multi-network operation environment).

In one variant, the network apparatus includes a 3GPP HSS+UDM (Home Subscriber Service and User Data Management) entity configured to maintain registration of a UE (user equipment) within both a first mobile network and a second mobile network simultaneously, the first mobile network comprising a 3GPP Long Term Evolution (LTE) network operated by a first network operator, and the second mobile network comprising a 3GPP 5G NR network operated by a second network operator different from the first network operator.

In one implementation, the computerized network apparatus comprises computerized logic configured for data communication with both (i) an MME (Mobility Management entity) of the LTE network, and (ii) an AMF (Access and Mobility Management Function) of the 5G NR network; and the LTE network comprises a first PLMN ID (public land mobile network identifier), and the 5G NR network comprises a second PLMN ID.

In a further aspect, a wireless network architecture is disclosed. In one embodiment, the architecture includes an $HSS+UDM_e$, and a 4G/4.5 RAN. The architecture is configured to support multi-PLMN, DRM operation by a UE (e.g., $UE_e$). In one variant, the architecture obviates use of the N26 interface during at least such multi-PLMN operation.

In an additional aspect of the disclosure, computer readable apparatus is described. In one embodiment, the apparatus includes a storage medium configured to store one or more computer programs, and includes a program memory or HDD or SSD on a computerized device such as the aforementioned $HSS+UDM_e$, or $MME_e$.

In another embodiment, the computer readable apparatus comprises a USIM (Universal Subscriber Identity Module), which is configured to contain at least two PLMN identifiers (e.g., MCC+MNC#1, MCC+MNC#2) relevant to maintaining connection within two different PLMNs in e.g., 4G/4.5G and 5G networks.

In yet another aspect, a system is disclosed. In one embodiment, the system includes (i) an HSS+UDM$_e$ entity, and (ii) one or more MME$_e$, entities.

In a further aspect, a method of operating a mobile device so as to maintain connection to two or more different PLMNs is disclosed.

In yet another aspect, a method of reducing operating expenditures (OPEX) within a mobile wireless network architecture is disclosed.

In another aspect, a method of operating a wireless network infrastructure is disclosed. In one embodiment, the method includes: identifying a first registration of a user device within the wireless network infrastructure, the wireless network infrastructure operated by a first network operator; receiving data relating to a second registration of the user device within a second wireless network infrastructure operated by a second network operator; evaluating the received data relating to the second registration for prescribed data; determining that the prescribed data is not present within the received data relating to the second registration; and based at least on the determining, enabling maintenance of both the first registration and the second registration simultaneously.

In one variant of the method, the identifying comprises data communication with an AMF (Access and Mobility Management Function) of 3GPP 5G NR (New Radio) network; the receiving data comprises receiving data from an MME (Mobility Management entity) of a 3GPP LTE (Long Term Evolution) network; the LTE network comprises a first PLMN ID (public land mobile network identifier); the 5G NR network comprises a second PLMN ID; and the enabling maintenance of both the first registration and the second registration simultaneously comprises operation of the user device using both the first PLMN ID and the second PLMN ID.

These and other aspects shall become apparent when considered in light of the disclosure provided herein.

BRIEF DESCRIPTION OF THE DRAWINGS

FIGS. 4a-9 © Copyright 2018-2019 Charter Communications Operating, LLC. All rights reserved. Other Figures © Copyright of their respective copyright holders.

DETAILED DESCRIPTION

Figure 1:
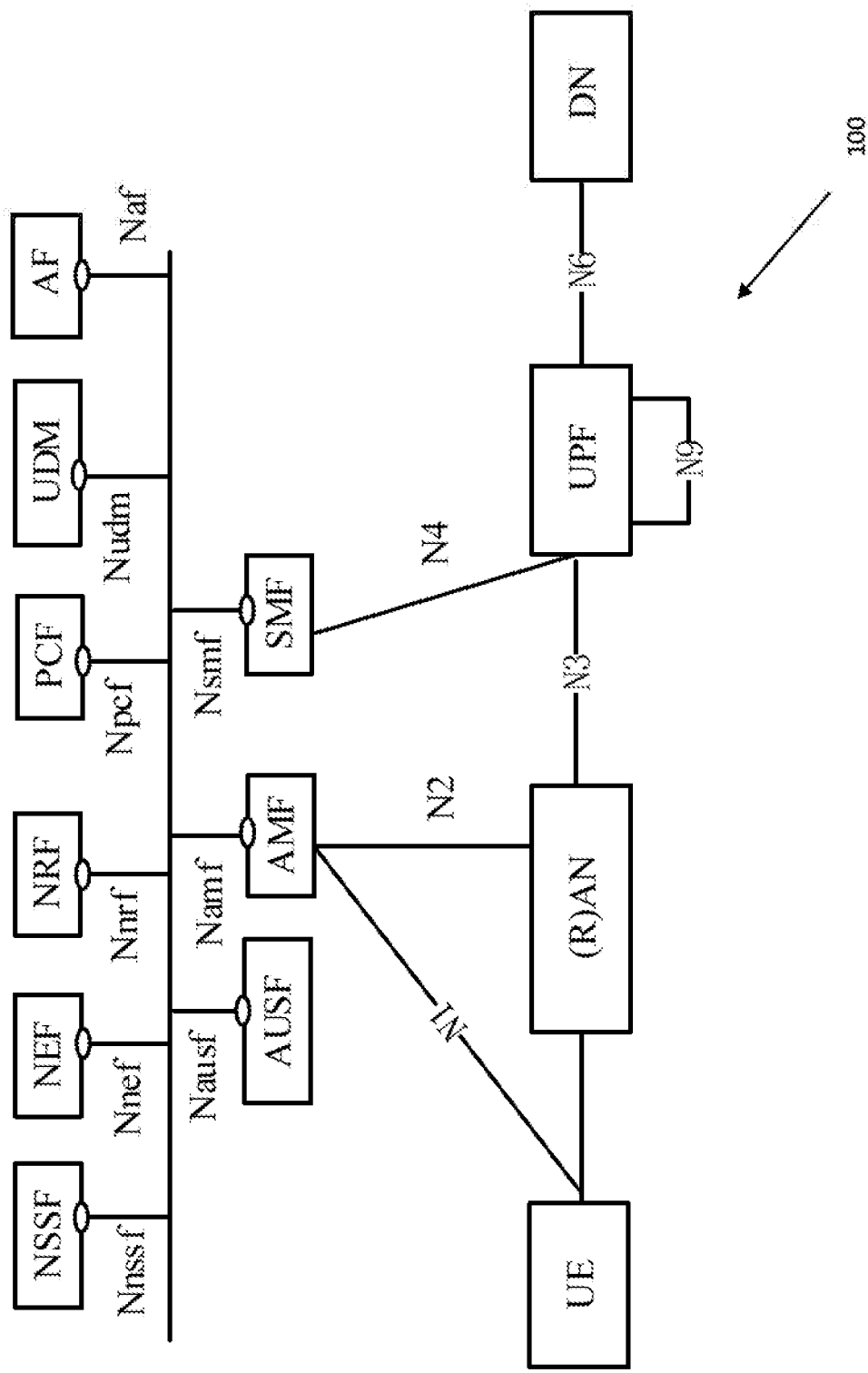
FIG. 1 is a functional block diagram of a prior art 5G system architecture and the various components thereof.

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the gNB that controls the operation of one or more gNB-DUs.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB, and its operation is partly controlled by gNB-CU (referenced above). One gNB-DU supports one or multiple cells, yet a given cell is supported by only one gNB-DU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

Overview

In one exemplary aspect, the present disclosure provides improved methods and apparatus for providing enhanced wireless services which, inter alia, enable operation of a given mobile device (e.g., a 3GPP-compliant UE) within two or more mobile networks (e.g., PLMNs) of respective different operators.

In one implementation, this enhanced functionality is provided by using the UE in so-called dual-registration mode or DRM to allow different interworking between the two networks, and by taking advantage of independent registration capability of the UE to 5GC and EPC infrastructure (i.e., by enabling the UE to register with and connect to PLMNs associated with the 5G and EPC networks). With such enhancements, a DRM-enabled UE can operate in both PLMNs (e.g., a "visited" or secondary PLMN, and a Home PLMN) simultaneously, thereby effectively providing, inter alia, umbrella 4G/4.5G coverage over one or more small-cell 5G networks, with respective independent operators of each.

For instance, in one use case, an MSO or other entity may build a small cell, data-only network with 5G capability, and partner with a "macro" MNO or MVNO for provision of voice or other services to the MSO subscribers. As such, the two entities can split or divide into two logical networks; i.e., the MNO can assume the role of the visited or secondary PLMN, while the MSO assumes the role of the HPLMN. Enhanced DRM-UE$_e$ capability as described herein advantageously allows for such services (e.g., voice service) and interworking between the macro and small-cell layers of the system without complicated network configuration requirements between the two operating networks.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access networks (e.g., 5GS and ECS) associated with or supported at least in part by a managed network of a service provider (e.g., MSO and/or MNO networks), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses. Yet other applications are possible.

Other features and advantages of the present disclosure will immediately be recognized by persons of ordinary skill in the art with reference to the attached drawings and detailed description of exemplary embodiments as given below.

Multi-PLMN Network Architecture

Figure 4A:
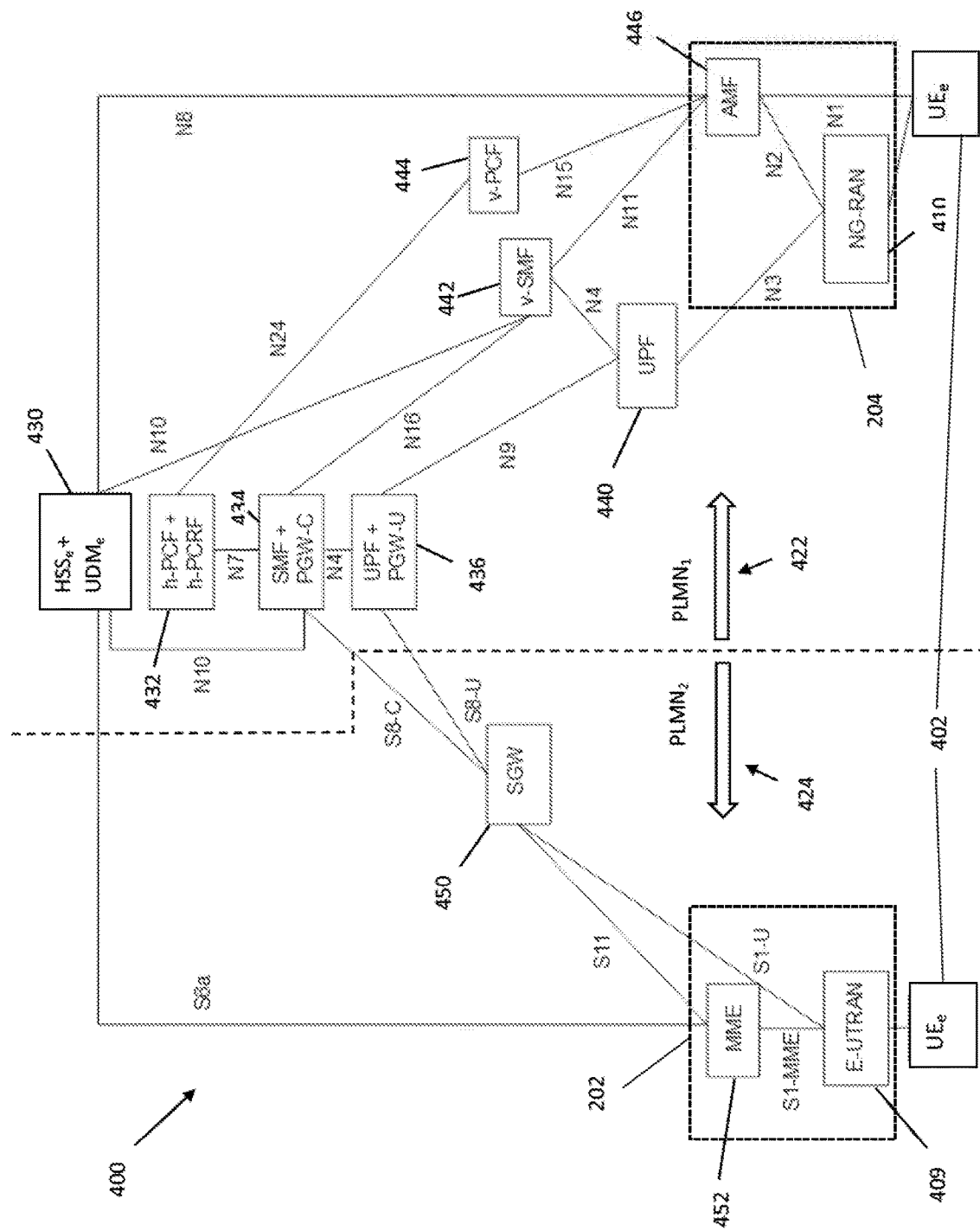
FIG. 4a is a functional block diagram of a first exemplary embodiment of an enhanced E-UTRAN/5G network architecture according to the present disclosure.

FIG. 4a is a functional block diagram of a first exemplary embodiment of an enhanced E-UTRAN/5G network architecture according to the present disclosure. Specifically, as shown in FIG. 4a, the architecture 400 includes generally both a legacy or 4G/4.5G RAN 202 and a 5G-NR RAN (NG-RAN) 204 of the type previously described, as well notably two (2) distinct PLMNs (here, PLMN$_1$ 422 and PLMN$_2$ 424), although it will be appreciated that configurations with different numbers of and/or other types of RANs may be utilized consistent with the present disclosure; e.g., a given PLMN may have multiple RANs including mixtures of legacy and next-generation technology, as well as unlicensed (e.g., ISM-band) and/or quasi-licensed (e.g., CBRS) apparatus and a capability associated therewith.

As shown, an enhanced UE (UE$_e$) 402 of the type described subsequently herein in detail is disposed to operate "within" the two RANs 202, 204, whether individually or concurrently. In the exemplary use case or operational scenario, the UE$_e$ 402 is DRM-enabled (i.e., can operate in 5G DRM) and is configured such that it can form radio technology connections with the associated RANs (i.e., form an RRC connection with the legacy E-UTRAN 409, and a similar connection with the NG-RAN 410) via relevant portions of its protocol stack and wireless interfaces, including simultaneously.

Figure 2A:
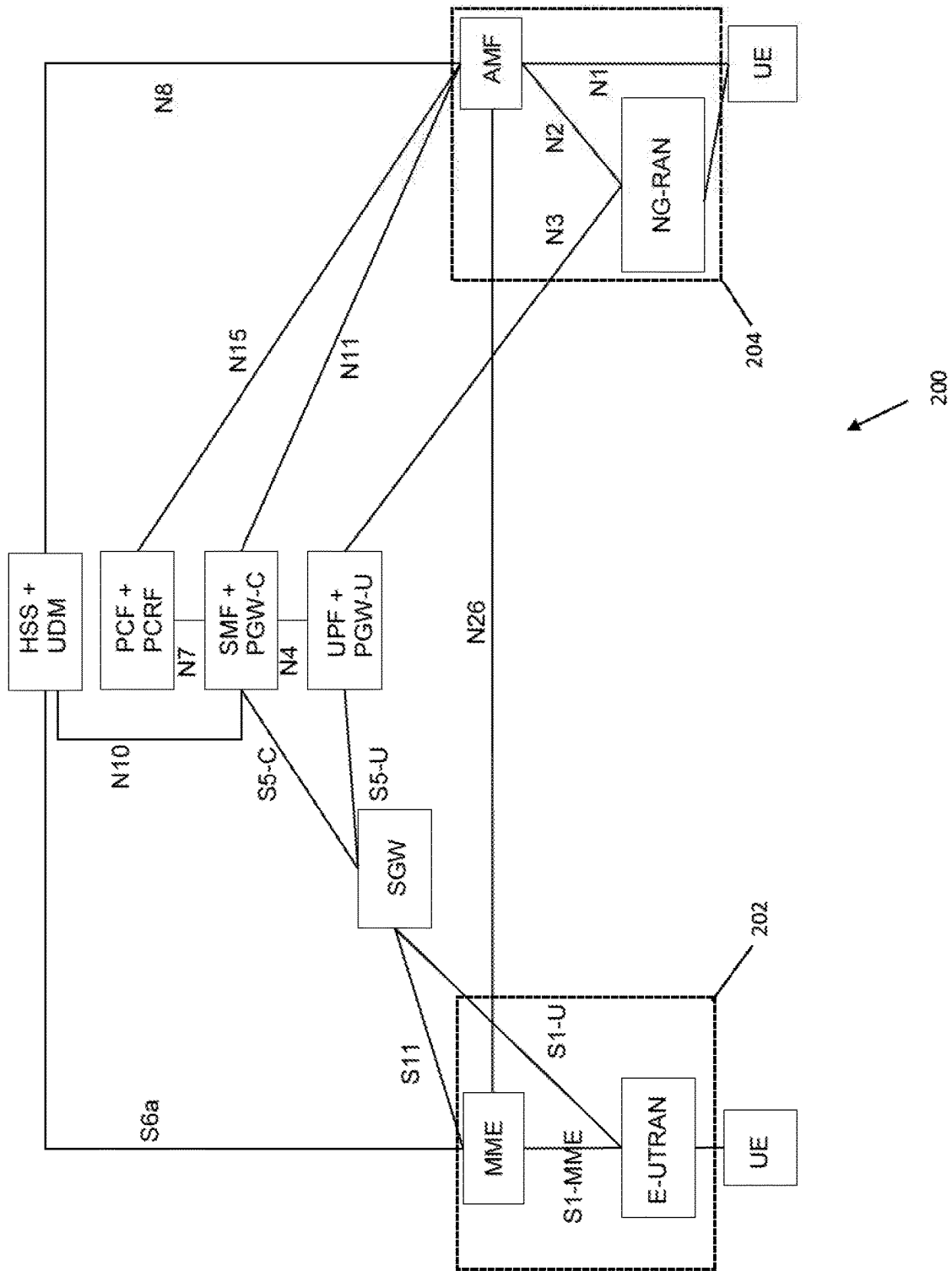
FIG. 2a is a block diagram showing the extant architecture for interworking between 5GS and EPC/E-UTRAN as defined in 3GPP TS 23.501 (FIG. 4.3.1-1 thereof), specifically the non-roaming architecture for interworking between the 5GS and the EPC/E-UTRAN.
Figure 2B:
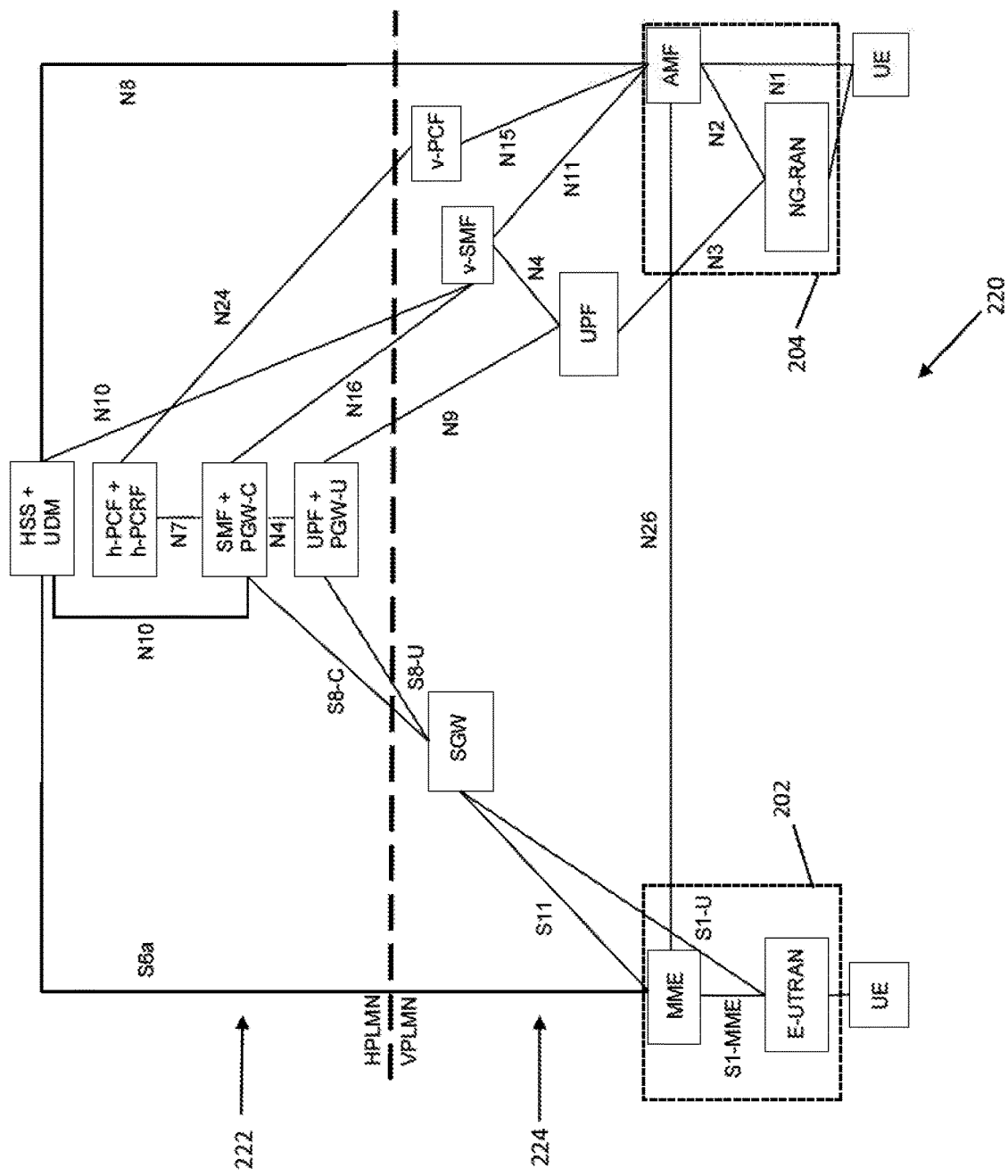
FIG. 2b is a block diagram from 3GPP TS 23.501 (FIG. 4.3.2-2) illustrating illustrates the home-routed roaming architecture for interworking between the 5GS and the EPC/E-UTRAN.
Figure 3:
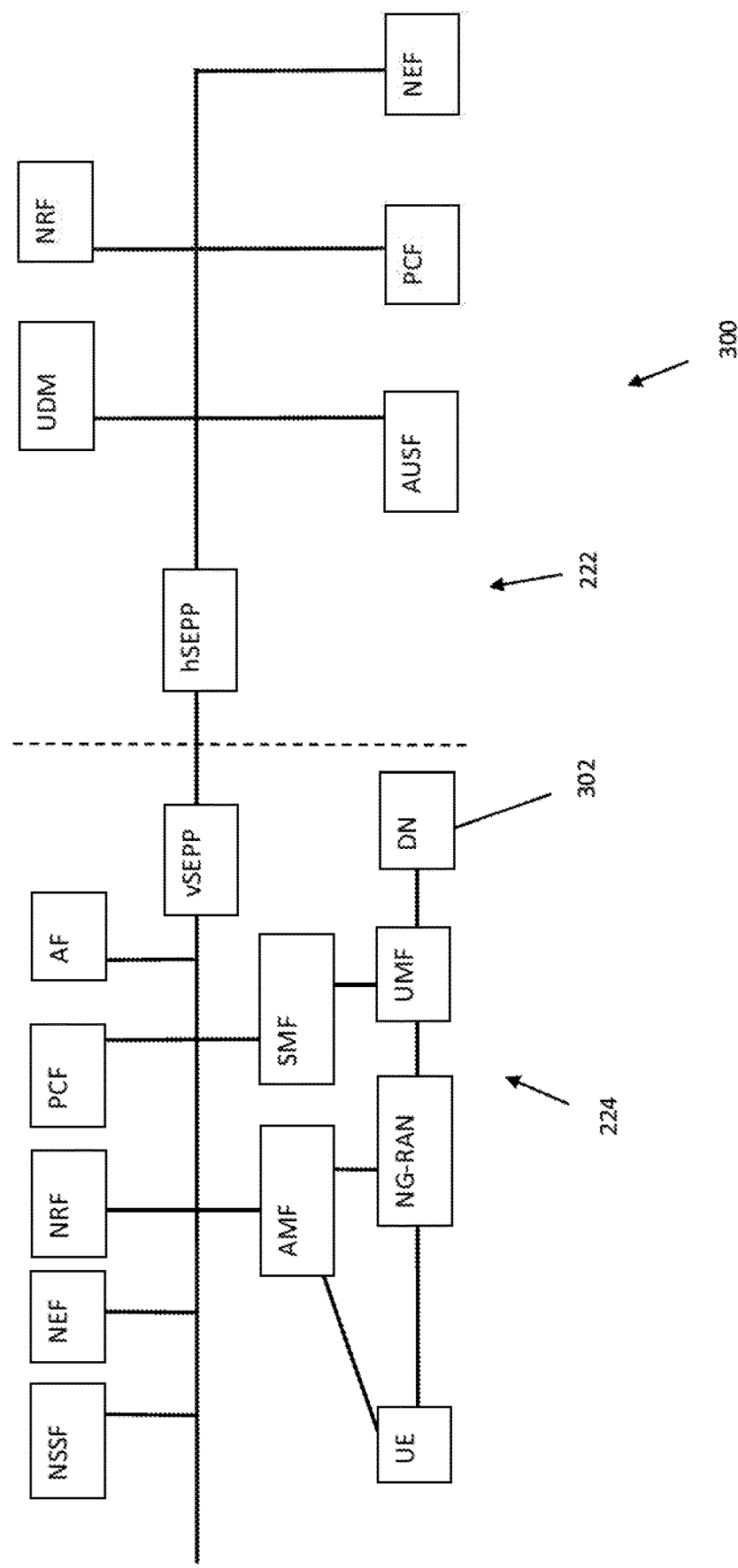
FIG. 3 is a block diagram illustrating the relationship of various 5G network components within a Visited Public Land Mobile Network (VPLMN) and a Home PLMN (HPLMN) according to a roaming "breakout" scenario.

Note that as illustrated by the dashed vertical line in FIG. 4, the various components of the prior art architecture 220 of FIG. 2b have been logically re-allocated to PLMN$_1$ 422 and PLMN$_2$ 424, such that PLMN$_1$ 422 in this implementation maintains the "home" network components, including: (i) the enhanced HSS+UDM (HSS+UDM$_e$) 430, (ii) h-PCF+h-PCRF 432, (iii) SMF+PGW-C 434, and (iv) UPF+PGW-U 436. Of these components, the enhanced HSS+UDM (HSS+UDM$_e$) 430 notably includes modifications to permit for "intelligent" 5G connection/registration management, as described in greater detail subsequently herein.

Also included within PLMN$_1$ in FIG. 4a are the UPF 440, v-SMF 442, and v-PCF 444, which communicate with the aforementioned functions 430-436 as shown, as well as the NG-RAN components including the AMF or Access and Mobility Management function 446 as specified in TS 23.501.

In the exemplary configuration, PLMN$_1$ is equated to the previously described HPLMN (Home PLMN) of the UE$_e$ 402, and hence PLMN$_1$ performs such home network functions for the UEe when the latter is associated with (connected to) the 5G RAN 204.

Further shown in FIG. 4a is the allocation of the SGW 450 and EPS/E-UTRAN components 202 (including E-UTRAN MME/MME$_e$ 452, such as specified by TS 23.401) logically within PLMN$_2$. In this configuration, PLMN$_2$ assumes the role of a new PLMN, herein defined as the "secondary" PLMN or SPLMN. At the network side, the SPLMN treats the UE$_e$ as a "roaming" or visiting UE. At the UE$_e$ side, the UE$_e$ registers to both the SPLMN and HPLMN at the same time. As such, the DRM-enabled UE$_e$ 402 may be defined or configured with both HPLMN (PLMN$_1$) and SPLMN (PLMN$_2$) data, including within the UE$_3$'s SE (Secure Element) such as its USIM device, on the UE$_e$ itself (e.g., within its program memory or other storage device outside of the USIM), or both. The exemplary configuration of the DRM-enabled UE$_e$ maintains a separate Equivalent PLMN (EPLMN) list for both the SPLMN and HPLMN. In the exemplary configuration, to allow provision for multiple HPLMN (PLMN$_1$) codes and SPLMN (PLMN$_2$), PLMN codes that are present within this list received from AMF 446 and MME/MME$_e$ 452 shall replace the HPLMN code derived from the IMSI for HPLMN and SPLMN for reselection purposes.

In the exemplary embodiment, the DRM-enabled UE$_e$ stores a primary SPLMN application list. For example, a voice application uses the SPLMN as its primary PLMN for servicing calls, and is configured to fall back to an HPLMN as its secondary network. The DRM-enabled UE$_e$ 402 uses its designated HPLMN for data services as a default, unless they are listed in the primary SPLMN application/services list (described elsewhere herein).

As described in greater detail below with respect to FIGS. 6a and 6b, when the 5G-regsitered UE$_e$ is moving from the 5GC to the EPC (i.e., from 5G to legacy 4G or 4.5G), it indicates to the MME$_e$ 452 that it is moving from the 5GC. This indication allows the MMEe to not include "initial attach" indicator to the HSS+UDM$_e$ 430 of PLMN$_1$. This results in the HSS+UDM$_e$ not cancelling the extant registration of the AMF 444, if any.

Figure 4B:
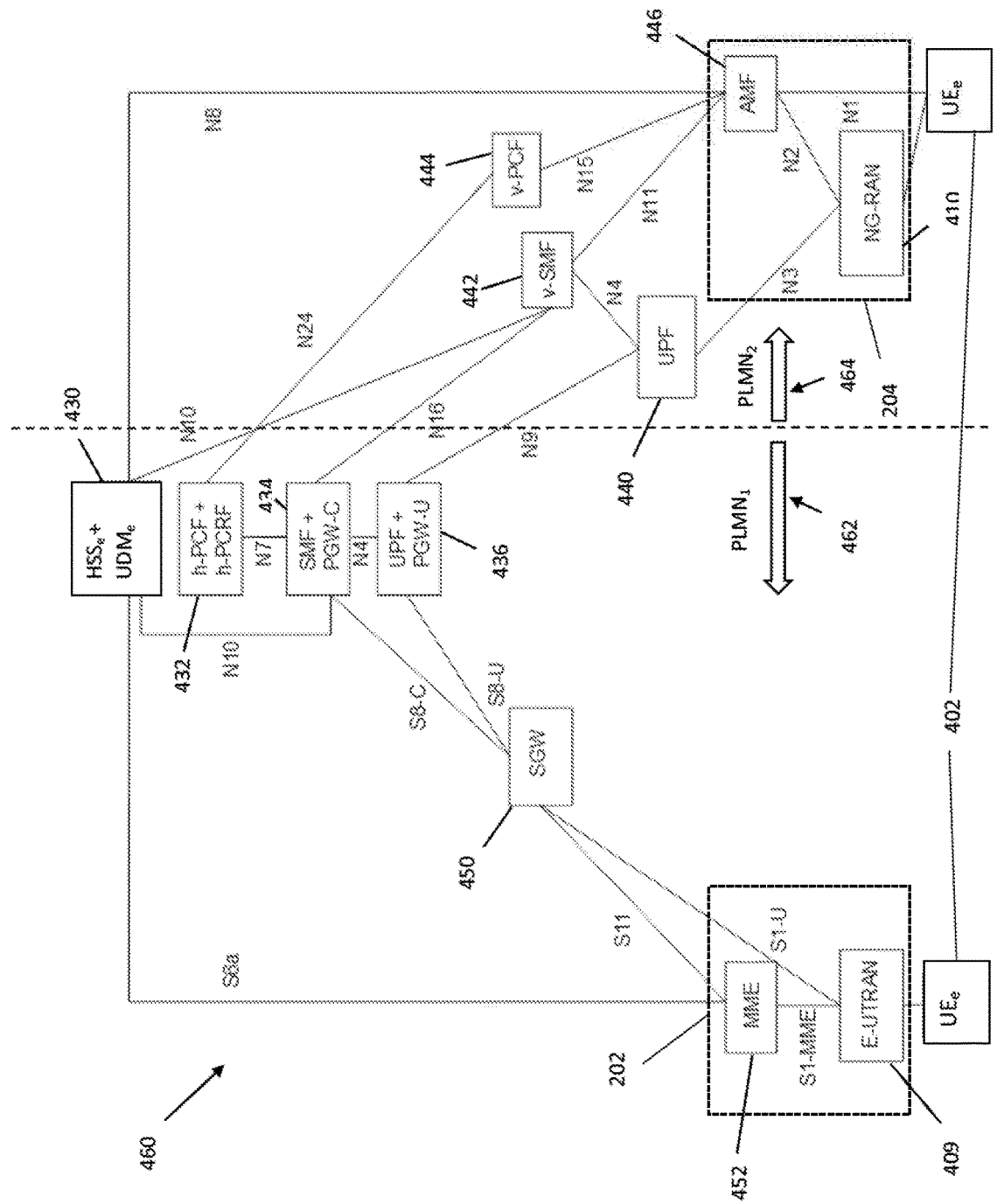
FIG. 4b is a functional block diagram of a second exemplary embodiment of an enhanced E-UTRAN/5G network architecture according to the present disclosure.

It will be appreciated that while the architecture 400 of FIG. 4a is shown with the 5G RAN 204 disposed as part of PLMN$_1$ (e.g., the HPLMN) and the E-UTRAN/MME/MME$_e$ disposed as part of PLMN$_2$ (e.g., SPLMN), other configurations are possible consistent with the present disclosure. For example, FIG. 4b is a functional block diagram of a second exemplary embodiment of an enhanced E-UTRAN/5G network architecture 460 according to the present disclosure, wherein the HSS+UDM$_e$ 430, h-PCF/h-PCRF 432, PGW 434, 436, and SGW 450 as well as the 4G/4.5G RAN 202 (with E-UTRAN and MME/MME$_e$) are part of PLMN$_1$ (e.g., the HPLMN) 462. The HSSe+UDMe are configured, similar to that of the architecture 400 of FIG.

4a, to interface and support operation of the UE_e 402; yet in this case, the 5G RAN and supporting components comprise PLMN_2 (the SPLMN).

Figure 4C:
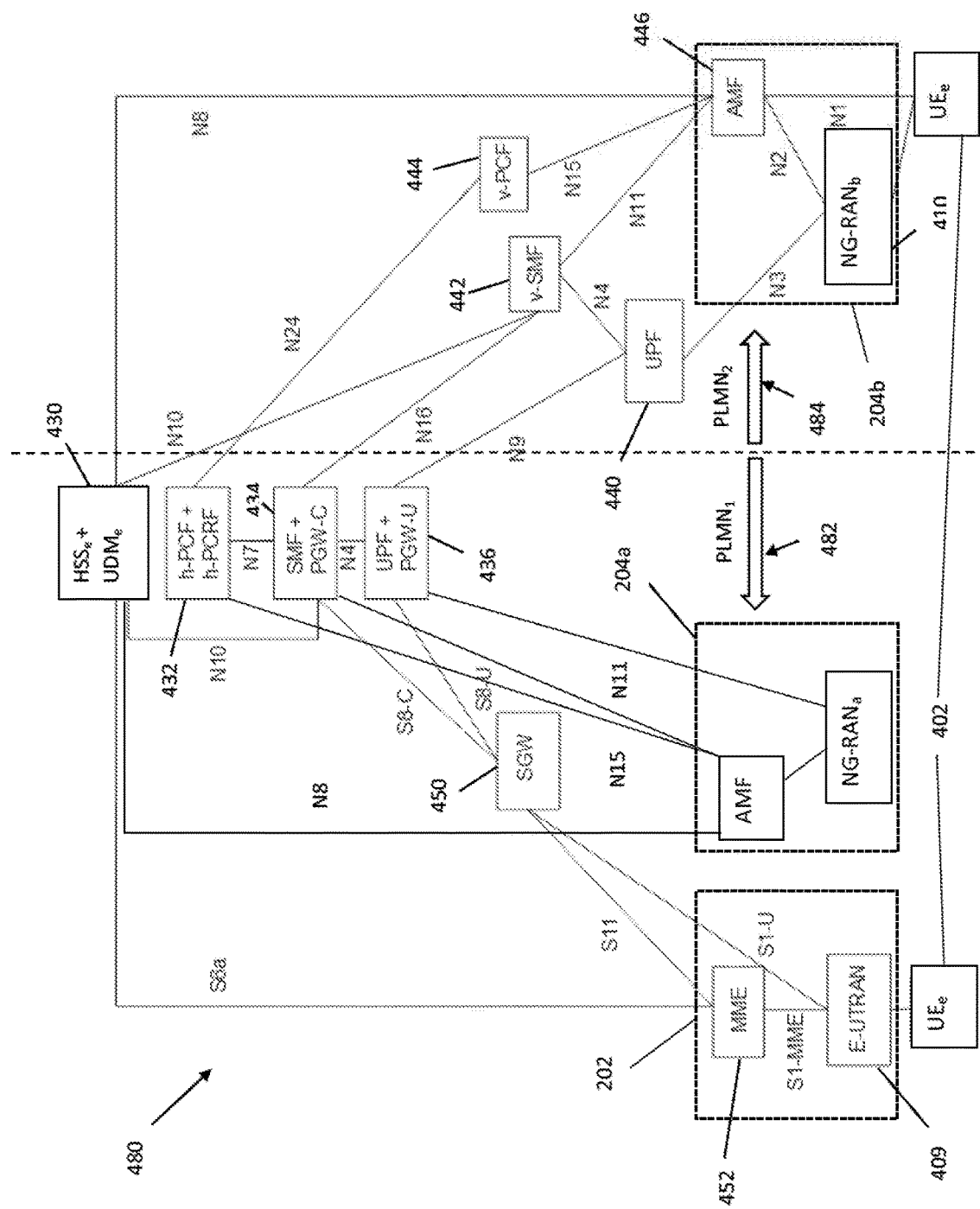
FIG. 4c is a functional block diagram of a third exemplary embodiment of an enhanced E-UTRAN/5G network architecture according to the present disclosure.

Likewise, FIG. 4c is a functional block diagram of a third exemplary embodiment of an enhanced E-UTRAN/5G network architecture 480 according to the present disclosure, wherein PLMN_1 (HPLMN in this example) includes both 4/4.5G and 5G RANs 202, 20a. PLMN_2 in this scenario includes a second 5G RAN 204b (e.g., one maintained by a different MNO or MSO) and the necessary infrastructure (UPF, V-SMF, v-PCF, etc.) to support UE_e operation therein, including where PLMN_2 acts as a secondary PLMN (SPLMN) for that UE_e. The UE_e can also utilize its "home" 5G RAN 204a when in range/coverage thereof, as well as its "home" E-UTRAN/MME/MME_e, such as in DRM operation. In one implementation, the UE_e will not advertise its 5G capability within PLMN_1.

Service Provider Network

Figure 5:
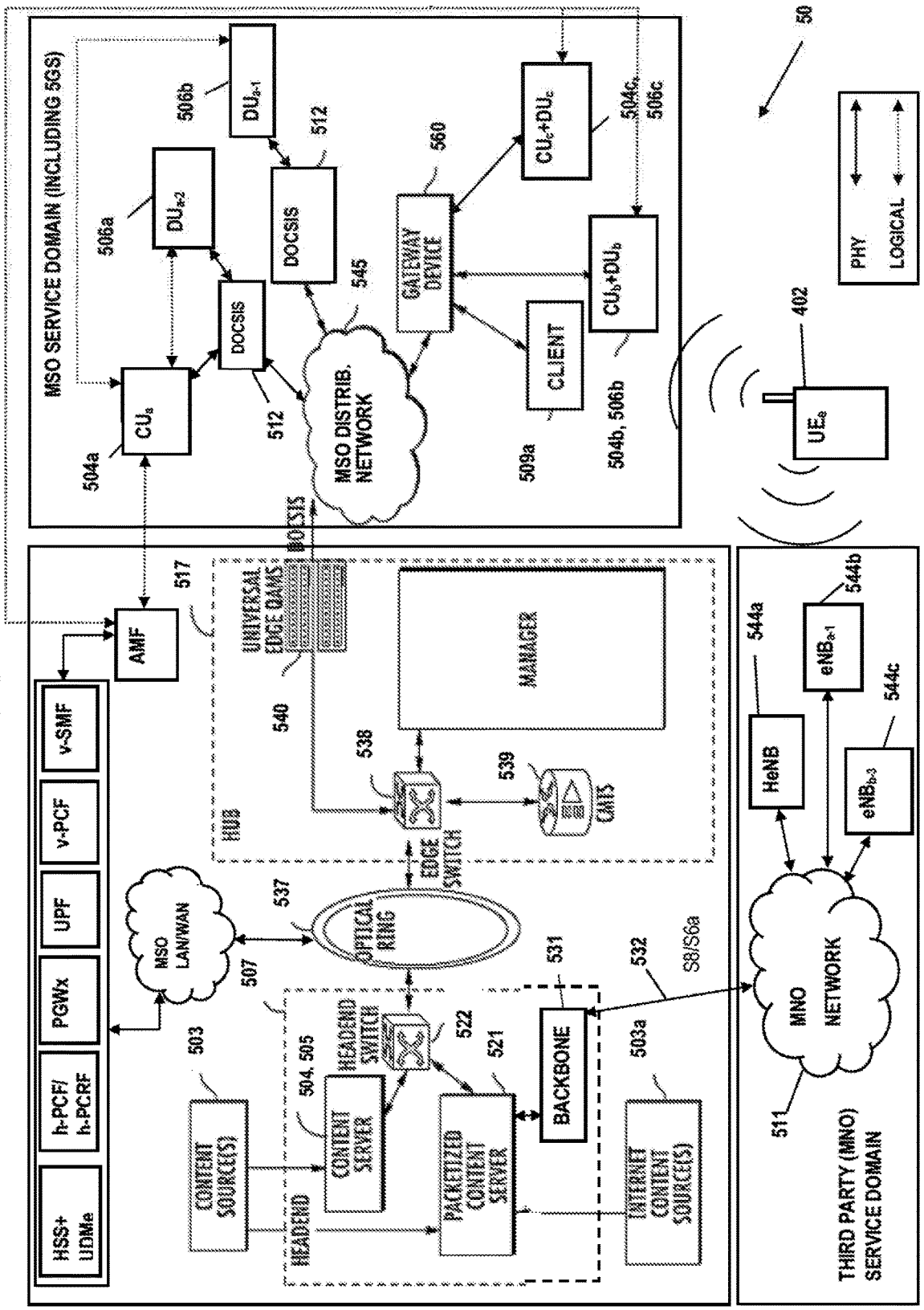
FIG. 5 is a functional block diagram of an exemplary MSO network architecture useful in conjunction with various features described herein.

FIG. 5 illustrates a typical service provider network configuration useful with the features of the enhanced registration and connection apparatus and methods described herein, including the enhanced 3GPP architecture 400 of FIG. 4. This service provider network 500 is used in one embodiment of the disclosure to provide backbone and backhaul from the service provider's service nodes, such as HFC cable or FTTC/FTTH drops to different premises or venues/residences. For example, one or more stand-alone or embedded DOCSIS cable modems (CMs) 512 are in data communication with the various NR (5G) architecture components (e.g., DU's and CU's) so as to provide two-way data communication to the served components.

Also provided within the architecture 500 of FIG. 5 is an MSO interface 532 to one or more MNO networks 511, such as those of an MVNO. The exemplary MNO/MVNO infrastructure or domain includes a number of 3GPP eNBs and HeNBs 544a-c as shown, thereby providing 3GPP 4G/4.5G coverage to authorized users of the MNO/MNVO network. These components (and others needed to support the E-UTRAN in the architecture of FIG. 4, such as the SGW and MME/MME_e—not shown in FIG. 5) interface with the MSO-domain (and ultimately the HSS+UDM_e) via e.g., a data interface 550 to the MSO backbone 531. In one embodiment, this interface 532 supports the S5/S8/S6a 3GPP interfaces between the S-GW and P-GW (S8 is used when roaming between different operators, while S5 is network-internal).

Figure 9:
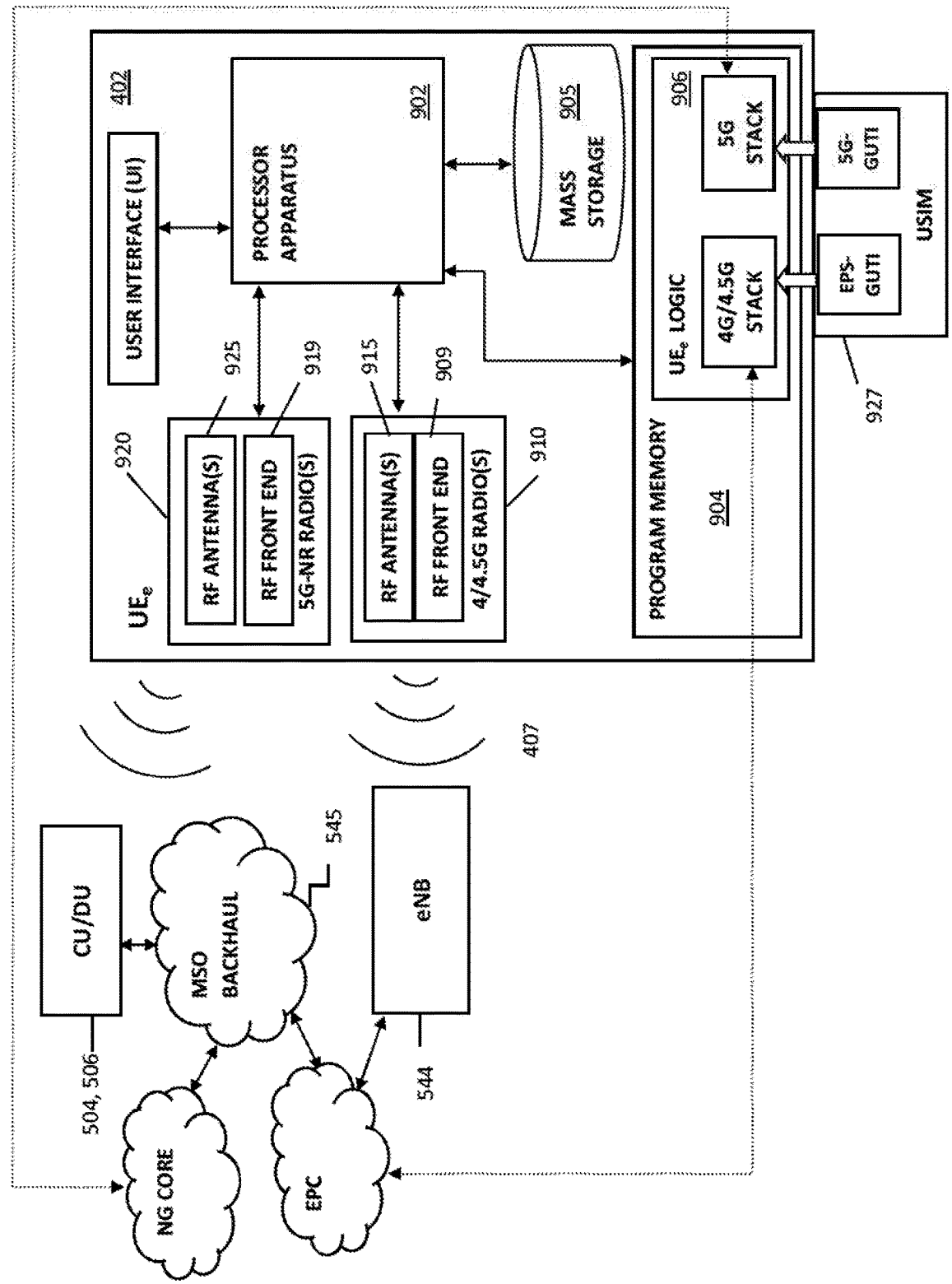
FIG. 9 is a functional block diagram illustrating a first exemplary embodiment of an enhanced 3GPP-compliant User Equipment (UE$_e$) apparatus useful with various embodiments of the present disclosure.

The enhanced UE (UE_e 402), as discussed further with respect to FIG. 9, includes two radio transceivers (one for 3GPP LTE, and one for 3GPP NR), or alternatively a common unified dual-mode transceiver, as well as two protocol stacks serving the respective transceivers for functions including support of higher layer processes such as authentication. As such, in so-called DRM mode, the UE_e can interface and connect with the different technology RANs (4G/4.5G and 5G) independently (and simultaneously if desired) as shown.

Also included in the infrastructure 500 of FIG. 5 are the HSS+UDM_e 430, PGW 434, 436, h-PCF/h-PCRF 432, AMF 446, v-PCF 444, v-SMF 442, and UPF 440 entities of FIG. 4a. While these entities are shown as part of the MSO "core" infrastructure portion, it will be appreciated that such entities each (i) may be distributed at two or more different/other locations within the MSO core or service domain(s); (ii) may be combined with each other or with other MSO infrastructure components (including those at the service domain), and (iii) may be virtualized as software/firmware processes within other components (such as MSO system servers, RAN infrastructure, etc.). Hence, the illustrated configuration of FIG. 5 is merely illustrative in this regard.

Moreover, it will be recognized that while the architecture 500 of FIG. 5 is characterized in the context of the embodiment of FIG. 4a (i.e., with 5G functionality logically and functionally contained with the PLMN_1 (HPLMN) network partition, the architecture 500 may readily be adapted by those of ordinary skill given the present disclosure for other embodiments or PLMN_1/PLMN_2, including for example those of FIGS. 4b and 4c.

In certain embodiments, the service provider network architecture 500 also advantageously permits the aggregation and/or analysis of subscriber- or account-specific data (including inter alia, particular CU or DU or E-UTRAN eNB/femtocell devices associated with such subscriber or accounts) as part of the provision of services to users under the exemplary delivery models described herein. As but one example, device-specific IDs (e.g., gNB ID, Global gNB Identifier, NCGI, MAC address or the like) can be cross-correlated to MSO subscriber data maintained at e.g., the network head end(s) 507 so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising; and (iii) determination of subscription level, and hence subscriber privileges and access to certain services as applicable. Moreover, device profiles for particular devices can be maintained by the MSO, such that the MSO (or its automated proxy processes) can model the device for wireless or other capabilities.

As a brief aside, a number of different identifiers are used in the NG-RAN architecture, including those of UE's (including the UE_3's described herein) and for other network entities. Specifically:

the AMF Identifier (AMF ID) is used to identify an AMF (Access and Mobility Management Function 446 shown in FIG. 4);

the NR Cell Global Identifier (NCGI), is used to identify NR cells globally, and is constructed from the PLMN identity to which the cell belongs, and the NR Cell Identity (NCI) of the cell;

the gNB Identifier (gNB ID) is used to identify gNBs within a PLMN, and is contained within the NCI of its cells;

the Global gNB ID, which is used to identify gNBs globally, and is constructed from the PLMN identity to which the gNB belongs, and the gNB ID;

the Tracking Area identity (TAI), which is used to identify tracking areas, and is constructed from the PLMN identity to which the tracking area belongs, and the TAC (Tracking Area Code) of the Tracking Area; and the Single Network Slice Selection Assistance information (S-NSSAI), which is used to identify a network slice.

Hence, depending on what data is useful to the MSO or its customers, various portions of the foregoing can be associated and stored to particular gNB "clients" or their components being backhauled by the MSO network.

The MSO network architecture 500 of FIG. 5 is particularly useful for the delivery of packetized content (e.g., encoded digital content carried within a packet or frame structure or protocol, such as video, audio, or voice data) consistent with the various aspects of the present disclosure. In addition to on-demand and broadcast content (e.g., live video programming), the system of FIG. 5 may deliver Internet data and OTT (over-the-top) services to the end users (including those of the DU's 506a-c) via the Internet protocol (IP) and TCP (i.e., over the 5G radio bearer), although other protocols and transport mechanisms of the type well known in the digital communication art may be substituted.

The network architecture 500 of FIG. 5 generally includes one or more headends 507 in communication with at least one hub 517 via an optical ring 537. The distribution hub 517 is able to provide content to various "client" devices 509a, 506a-c, and gateway devices 560 as applicable, via an interposed network infrastructure 545. It will be appreciated from examination of FIG. 5 that the various gNB components (including DU's and CU's and their constituent $UE_e$'s) may each act as a "client" device of the network. For example, in many installations, the CU 504 of a given gNB is physically disparate or removed from the locations of its constituent DU's 506, and hence an interposed (e.g., wired, wireless, optical) PHY bearer is needed to communicate data between the DU's and CU of a given gNB. In one such architecture, the CU may be placed further toward the core of the MSO distribution network, while the various constituent DU's are placed at the edge. Alternatively, both devices may be near the edge (and e.g., served by edge QAMs or RF carriers 540 as shown in FIG. 5). In both cases, the MSO infrastructure may be used to "backhaul" data from each device and communicate it to, via the MSO infrastructure, the other components, much as two geographically disparate customers of a given MSO might communicate data via their respective DOCSIS modems in their premises. Each component has an IP address within the network, and as such can be accessed (subject to the limitations of the architecture) by the other components.

Alternatively, the CU's (which in effect aggregate the traffic from the various constituent DU's towards the NG Core), may have a dedicated high bandwidth "drop."

Moreover, a given CU and DU may be co-located as desired, as shown by the combined units 504b and 504c, and 506b and 506c in FIG. 5. This may also be "hybridized," such as where one constituent DU is co-located (and potentially physically integrated) with the CU, while the remaining DU of that CU are geographically and physically distributed.

In the MSO network 500 of FIG. 5, various content sources 503, 503a are used to provide content to content servers 504, 505 and origin servers 521. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 503a (such as e.g., a web server) provide Internet content to a packetized content origin server(s) 521. Other IP content may also be received at the origin server(s) 521, such as voice over IP (VoIP) and/or IPTV content. Content may also be received from subscriber and non-subscriber devices (e.g., a PC or smartphone-originated user made video).

The network architecture 500 of FIG. 5 may further include a legacy multiplexer/encrypter/modulator (MEM; not shown). In the present context, the content server 504 and packetized content server 521 may be coupled via a LAN to a headend switching device 522 such as an 802.3z Gigabit Ethernet (or "10G") device. For downstream delivery via the MSO infrastructure (i.e., QAMs), video and audio content is multiplexed at the headend 507 and transmitted to the edge switch device 538 (which may also comprise an 802.3z Gigabit Ethernet device) via the optical ring 537.

In one exemplary content delivery paradigm, MPEG-based video content (e.g., MPEG-2, H.264/AVC) may be delivered to user IP-based client devices over the relevant physical transport (e.g., DOCSIS channels and 5G NR bearer of the respective DU 506); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). Delivery in such packetized modes may be unicast, multicast, or broadcast. Likewise, audio/telephony content can be delivered using the illustrated transport, including via other protocols such as RTP/RTCP over the bearer.

Individual devices such as cable modems 512 and associated gNB devices 504, 506 of the implementation of FIG. 5 may be configured to monitor the particular assigned RF channel (such as via a port or socket ID/address, or other such mechanism) for IP packets intended for the gNB/subscriber premises/address that they serve. The IP packets associated with Internet services are received by edge switch, and forwarded to the cable modem termination system (CMTS) 539. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the "client" gNB devices. The IP packets are typically transmitted on RF channels that are different than the "in band" RF channels used for the broadcast video and audio programming, although this is not a requirement.

In one implementation, the CMs 512 shown in FIG. 5 each service a premises or venue, such as a conference center or hospitality structure (e.g., hotel), which includes one or more DU nodes for provision of 5G NR services, and may also service WLAN (e.g., 802.11-2016 compliant Wi-Fi) nodes for WLAN access (e.g., within 2.4 GHz ISM band), or even E-UTRAN femtocells, CBRS (Citizens Broadband Radio Service) nodes, or other such devices.

In parallel with (or in place of) the foregoing delivery mechanisms, the MSO backbone 531 and other network components can be used to deliver packetized content to the "client" gNB devices 504, 506 via non-MSO networks. For example, so-called "OTT" content (whether tightly coupled or otherwise) can be ingested, stored within the MSO's network infrastructure, and delivered to the gNB CU 504 via an interposed service provider network (which may include a public Internet) 511 (e.g., at a local coffee shop, via a DU connected to the coffee shop's service provider via a modem, with the user's IP-enabled end-user device utilizing an Internet browser or MSO/third-party app to stream content according to an HTTP-based approach over the MSO backbone 531 to the third party network to the service provider modem (or optical demodulator) to the DU, and to the user device via the DU NR wireless interface.

It will further be recognized that user-plane data/traffic may also be routed and delivered apart from the CU. In one implementation (described above), the CU hosts both the RRC (control-plane) and PDCP (user-plane); however, as but one alternate embodiment, a so-called "dis-aggregated"

CU may be utilized, wherein a CU-CP entity (i.e., CU—control plane) hosts only the RRC related functions, and a CU-UP (CU—user plane) which is configured to host only PDCP/SDAP (user-plane) functions. The CU-CP and CU-UP entities can, in one variant, interface data and inter-process communications via an E1 data interface, although other approaches may be used.

In certain embodiments, each DU 506 is located within and/or services one or more areas within one or more venues or residences (e.g., a building, room, or plaza for commercial, corporate, academic purposes, and/or any other space suitable for wireless access). Each DU is configured to provide wireless network coverage within its coverage or connectivity range for its RAT (e.g., 5G NR). For example, a venue may have a wireless NR modem (DU) installed within the entrance thereof for prospective customers to connect to, including those in the parking lot via inter alia, their NR or LTE-enabled vehicles or personal devices of operators thereof. Notably, different classes of DU 506 may be utilized. In practical terms, some devices may have a working range on the order of hundreds of feet, while other devices may operate out to thousands of feet or more, the propagation and working range dictated by a number of factors, including the presence of RF or other interferers, physical topology of the venue/area, energy detection or sensitivity of the receiver, etc. Similarly, different types of NR-enabled DU 506 can be used depending on these factors, whether alone or with other wireless PHYs such as LTE, WLAN, etc.

It will also be appreciated that while described primarily with respect to a unitary gNB-CU entity or device 504 as shown in FIG. 5, the present disclosure is in no way limited to such architectures. For example, the techniques described herein may be implemented as part of a distributed or dis-aggregated or distributed CU entity (e.g., one wherein the user plane and control plane functions of the CU are dis-aggregated or distributed across two or more entities such as a CU-C (control) and CU-U (user)), and/or other functional divisions are employed.

It is also noted that heterogeneous architectures of eNBs, Home eNBs or femtocells (i.e., E-UTRAN LTE/LTE-A Node B's or base stations) and gNBs may be utilized consistent with the architectures of FIGS. 4a-5. For instance, a given DU may act (i) solely as a DU (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

Moreover, the enhanced DU/CU (i.e., $DU_e$ and $CU_e$) architectures set forth in co-owned and co-pending U.S. patent application Ser. No 15/945,657 filed Apr. 4, 2018 and entitled "APPARATUS AND METHODS FOR CELL ACTIVATION IN WIRELESS NETWORKS," incorporated herein by reference in its entirety, may be used consistent with the various aspects of the present disclosure.

Methodology

Figure 6A:
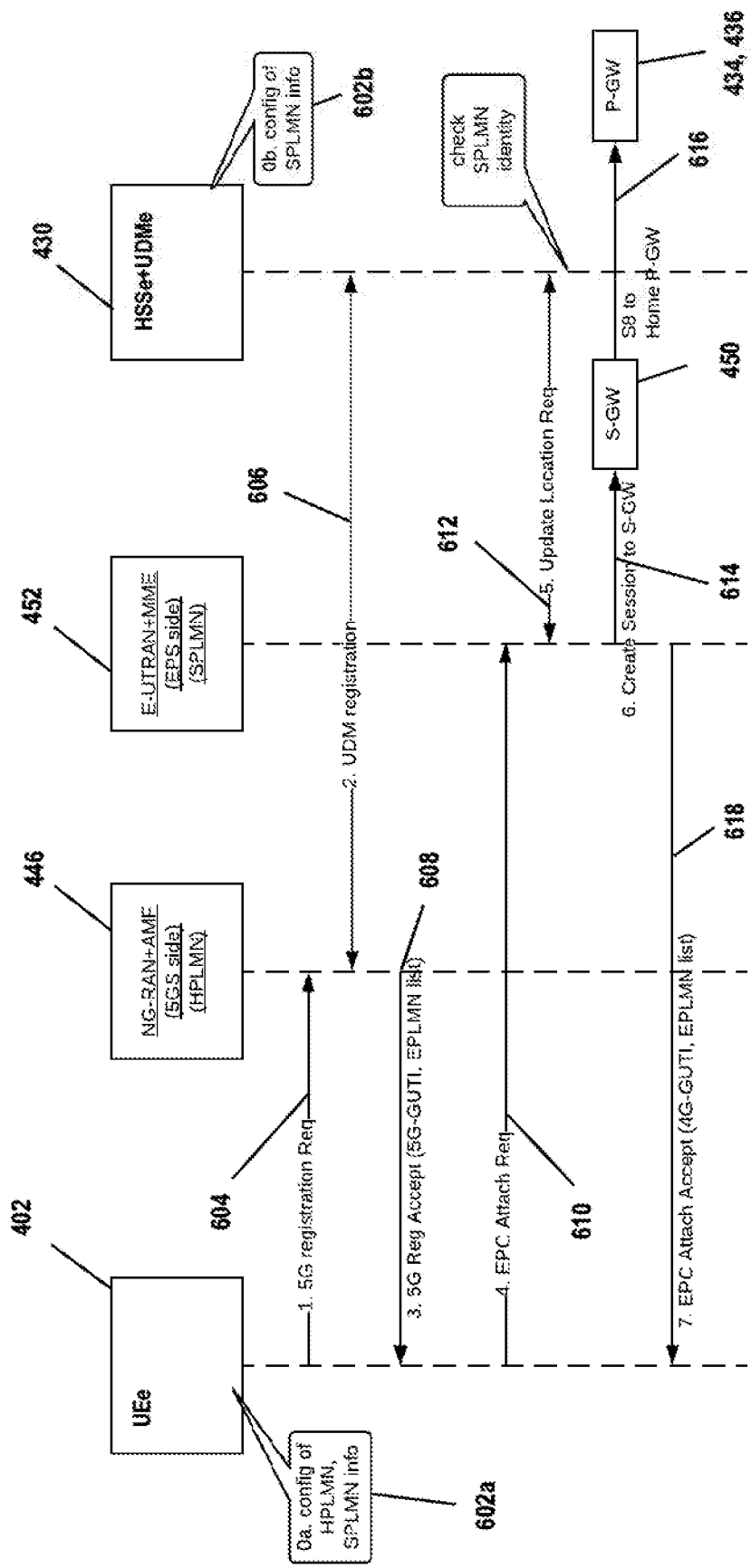
FIG. 6a is a ladder diagram illustrating an exemplary embodiment of a call flow for DRM-UE$_e$, registration to PLMN$_1$ and PLMN$_2$ (e.g., HPLMN and SPLMN, respectively) according to the present disclosure.
Figure 6B:
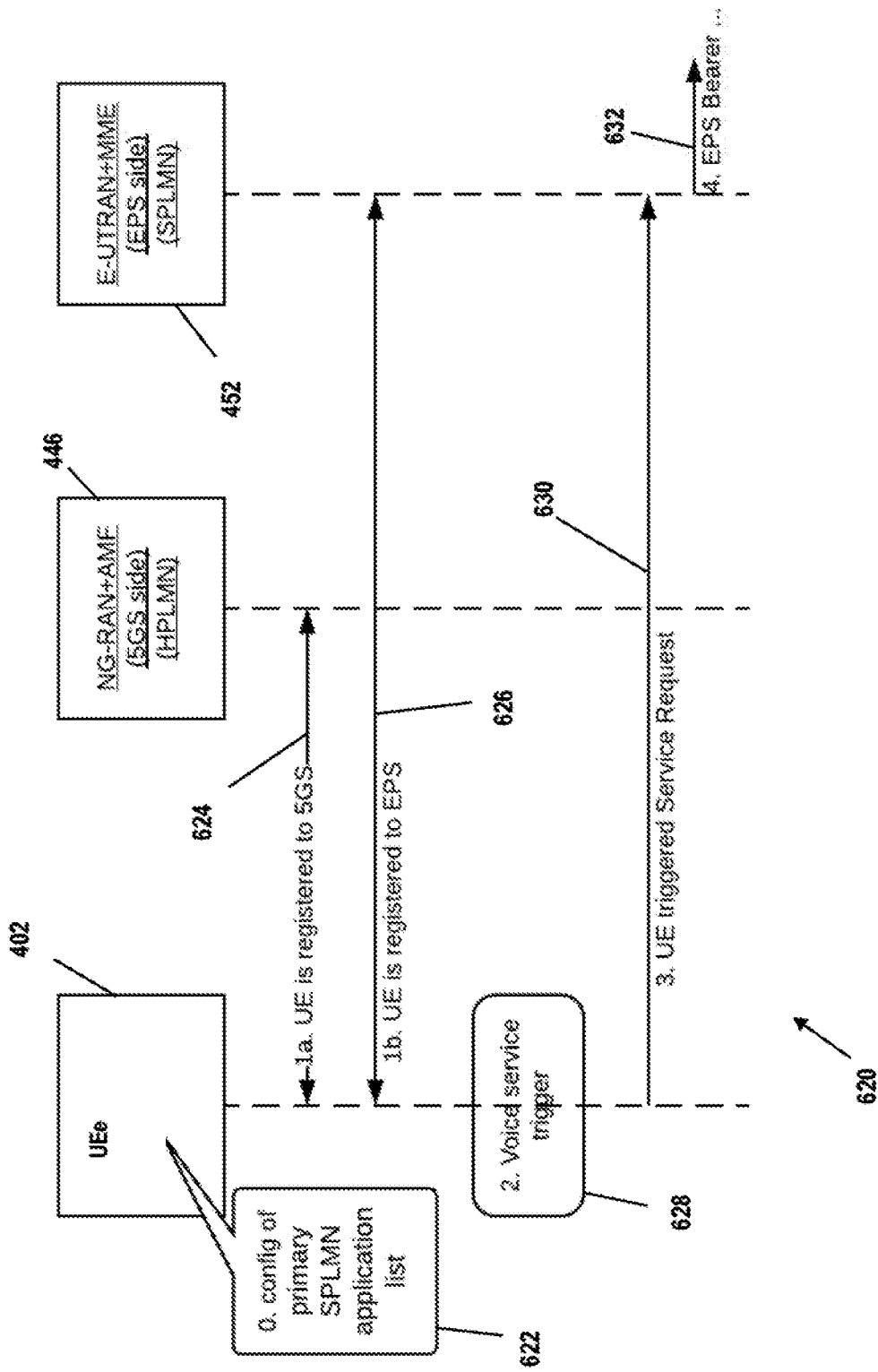
FIG. 6b is a ladder diagram illustrating an exemplary embodiment of a call flow for DRM-UE$_e$, service invocation according to the present disclosure.

Referring now to FIGS. 6a-6b, embodiments of the $UE_e$ registration and multi-PLMN operation methodologies (including exemplary call flow) of the present disclosure are now described in detail. While these methodologies are described in the exemplary context of the 3GPP 4G/4.5G and 5G RANs and infrastructure referenced above, it will be appreciated that it may be adapted to other procedures and applications by those of ordinary skill given the present disclosure, including other applications where a UE or mobile device maintains two different technology stacks and capability of operation with two different RANs.

Moreover, while described primarily in the context of the architecture 400 of FIG. 4a discussed supra, it will be recognized by those of ordinary skill given the present disclosure that these methods may be adapted for use with other architectures, such as e.g., those 460, 480 of FIGS. 4b and 4c, respectively.

FIG. 6a is a ladder diagram illustrating an exemplary embodiment of a call flow for DRM-enabled $UE_e$ registration to $PLMN_1$ and $PLMN_2$ (e.g., HPLMN and SPLMN, respectively) according to the present disclosure. At step 602a of the methodology 600 of FIG. 6a, the $UE_e$ is configured to include data relating to $PLMN_1$ 422 and $PLMN_2$ 424. This configuration may occur upon initial setup or registration of the $UE_e$ 402, sequentially as the different PLMNs are encountered, or via yet other mechanism such as user-initiated/conducted configuration. In that $PLMN_1$ is the HPLMN for the $UE_e$ 402, this data is resident at initial setup of the UEe within its own HPLMN, and is stored for example in the USIM of the $UE_e$ (see FIG. 9 herein). Conversely, since $PLMN_2$ (SPLMN) is not the $UE_e$'s home network, it may obtain this information via e.g., a list of PLMN IDs (e.g., MCC+MNC) provided to the $UE_e$ 402 and stored locally thereon (for example, also in the $UE_e$ USIM).

Similarly, per step 602b, the $HSS+UDM_e$ 430 are configured with the $PLMN_2$ network data. In the context of the architecture 400 of FIG. 4a, $PLMN_2$ 424 comprises the SPLMN, and hence is not native to the $HSS+UDM_e$ 430 which is part of the HPLMN ($PLMN_1$ 422). This configuration may be accomplished using any number of techniques, including for example configuration by a network operator or automated network supervisory process, communications over the S6a or other interface 532 (FIG. 5) from the $MME/MME_e$ 452, or other means. In one implementation, this data comprises a list stored locally in the $HSS+UDM_e$ 430.

At step 604, the $UE_e$ 402 sends a Registration Request message to the AMF 446 (via the 5G RAN DU/CU). In one variant, the 5G registration procedures as defined in 3GPP TS 23.502 (Section 4.2.2.2), incorporated herein by reference in its entirety, are utilized for this step.

Additionally, per step 606, the 5G AMF 446 communicates with the $HSS+UDM_e$ 430 for registration of the UEe within the 5G network.

Per step 608, the AMF 446 (and supporting components) respond to the Registration Request and provide the 5G-GUTI to the $UE_e$ 402. The received 5G-GUTI is used by the $UE_e$ within PLMN1 (in this scenario, the HPLMN 422). The AMF also provides the EPLMN list, which is used by the $UE_e$ for HPLMN reselection.

At step 610, the UEe is registered to $PLMN_2$ (SPLMN). In one embodiment, this registration is accomplished using the EPC "attach" procedure as defined in 3GPP TS 23.401, Section 5.3.2, incorporated herein by reference in its entirety. As shown, the $MME/MME_e$, 452 of $PLMN_2$ (SPLMN) treats this UEe Attach Request as being of a roaming subscriber. The S6a interface 532 (see FIG. 5) is used for routing to the UEe's HPLMN (here $PLMN_1$). In one implementation, during initial registration, the $UE_e$ 402 includes "moving from 5GC" indication (data) to the EPC $MME/MME_e$ 452 as part of step 610, thereby indicating to the SPLMN that the $UE_e$ is roaming from a 5G network. This allows the receiving $MME/MME_e$ 452 to not include an "initial attach" indicator in its transmission to the $HSS+UDM_e$ 430 (see discussion of step 612 below), thereby triggering the desired behavior in the $HSS+UDM_e$ 430.

Specifically, per step 612, the MME/MME$_e$ 452 transmits an Update Location Request message to the HSS+UDM$_e$ 430 without the "initial attach" indication, thereby resulting in the HSS+UDM$_e$ 430 not cancelling the registration of the UE$_e$ with the AMF 446. The HSS+UDM$_e$ 430 checks the SPLMN ID from MME/MME$_e$ identity in the Update Location Request message; if the ID matches the SPLMN list (stored in step 602b discussed supra), the HSS+UDM$_e$ will not send a message canceling registration to the 5GS.

Conversely, in instances where the MME/MME$_e$ 452 has not been upgraded (i.e., is merely a non-inventive MME), it will ignore the "moving from 5GC" indication (data) since it does not have the capability to interpret it, and assume that it is processing an initial attach for the UEe.

In step 614, the MME/MME$_e$ 452 initiates a session request to the SGW 450, which then utilizes the S8 interface 532 to communicate the request to the PGW 434, 436 in the HPLMN of the UE$_e$ 402 (step 616).

In step 618, the MME/MME$_e$ 452 transmits an Attach message to the UE$_e$ 402, including the 4G/4.5G-GUTI and the EPLMN list. The received EPLMN list is in the exemplary implementation used for SPLMN reselection only. The received 4G/4.5G-GUTI is used by the UE$_e$ within the SPLMN (PLMN$_2$).

Note that after the completion of step 618, the UE$_e$ contains two EPLMN lists (one received per step 608, and one per step 618). The SPLMN 424 (EPS) treats the UE$_e$ as a roaming subscriber from the HPLMN 422, while the UE$_e$ is also operating within its HPLMN 422 on the 5GS. As such, the UEe can operate as a DRM device within two separate PLMNs (PLMN$_1$ and PLMN$_2$, e.g., the HPLMN and the SPLMN, respectively).

In those instances where a non-enhanced MME is being utilized for the EPC registration, as noted above, the MME will simply ignore the "moving from 5GC" data and presume that an initial attach is underway, thereby signaling the HSS+UDM$_e$ accordingly. Advantageously, in such cases, the HSS+UDM$_e$ is configured to be aware the SPLMN identity registering the UE$_e$ 402, thereby permitting the HSS+UDM$_e$ 430 to bypass transmission of the registration cancellation to the 5GS (and hence maintain any existing AMF registration and connection).

FIG. 6b is a ladder diagram illustrating an exemplary embodiment of a call flow for DRM-UE$_e$ service invocation according to the present disclosure. At step 622, the (DRM) UE$_e$ 402 is configured with data indicative of a list of services and/or applications that will use PLMN$_2$ (e.g., the SPLMN) instead of PLMN$_1$ (the HPLMN). This data may be installed at time of provisioning of the UEe, received via message from the UE$_e$'s HPLMN after initial provisioning, or otherwise.

Per step 624, the UE$_e$ 402 sends an Registration Request message to the AMF 446 (via the 5G RAN DU/CU) as previously described (see FIG. 6a). In one variant, the 5G registration procedures as defined in 3GPP TS 23.502 (Section 4.2.2.2), incorporated herein by reference in its entirety, are utilized for this step.

Per step 626, the UE$_e$ 402 then completes registration with the MME/MME$_e$ 452 of PLMN$_2$ (SPLMN) as previously described (see FIG. 6a).

Per step 628, the applicable service or application is initiated (in this scenarios, a voice service is triggered). Per the list data of step 622, the voice service is configured to use PLMN$_1$ (HPLMN).

Per step 630, the UE$_e$ triggers "UE triggered Service Request" procedure (e.g., such as that set forth in 3GPP TS 23.401, Section 5.3.4) to establish an EPS (4G/4.5G) bearer required for the voice service. The UE$_e$ sends the triggering Service Request to the MME/MME$_e$ 452, which then invokes the required bearer per step 632.

OPEX Benefits

As discussed supra, under prior art approaches, a hypothetical UE that could simultaneously connect to both PLMNs would require the support of dual SIMs/USIMs. Such dual SIM/USIM UE would operates as two logical UEs, yet aggregated into a e.g., common form factor. On the network side, two HSS entities would be required (i.e., one HSS per PLMN) and both PLMNs would be operated independently of each other. Since the UE would only be a subscriber to one operator, managing one subscription via two PLMNs would require significant additional OPEX.

As one specific example of the foregoing, in order to allow IP address preservation when the hypothetical UE switched data connections from one PLMN to another, an additional middle-layer protocol (e.g., akin to a multi-path TCP for the transport layer) in the UE with the corresponding server in the network would be required. This requirement adds additional OPEX (and also CAPEX) to the system.

Conversely, using the methods and apparatus of the present disclosure in this context, the same data anchoring point (i.e., the SMF+PGW-C) can be assigned regardless of whether the UE$_e$ is connected via PLMN$_2$ (e.g., the SPLMN) or PLMN$_1$ (e.g., the HPLMN) of exemplary FIG. 4a. Hence, IP address preservation can advantageously be accomplished without additional server/middle-layer protocols.

In addition, the above hypothetical subscriber/UE with dual SIMs/USIMs has two subscription records to be managed (i.e., one HSS from each PLMN). Accordingly, any upgrade/downgrade to the subscription profiles (e.g., allowed data throughput or types of services or applications) would have to be managed in both HSS entities. This requirement creates another OPEX requirement for subscription data synchronization between the different HSS entities from both PLMNs. Conversely, the methods and apparatus described herein obviates this issue by only using the HSS (i.e., the HSS+UDM$_e$ 430) from the UE$_e$'s HPLMN 422.

MME$_e$ Apparatus—

Figure 7:
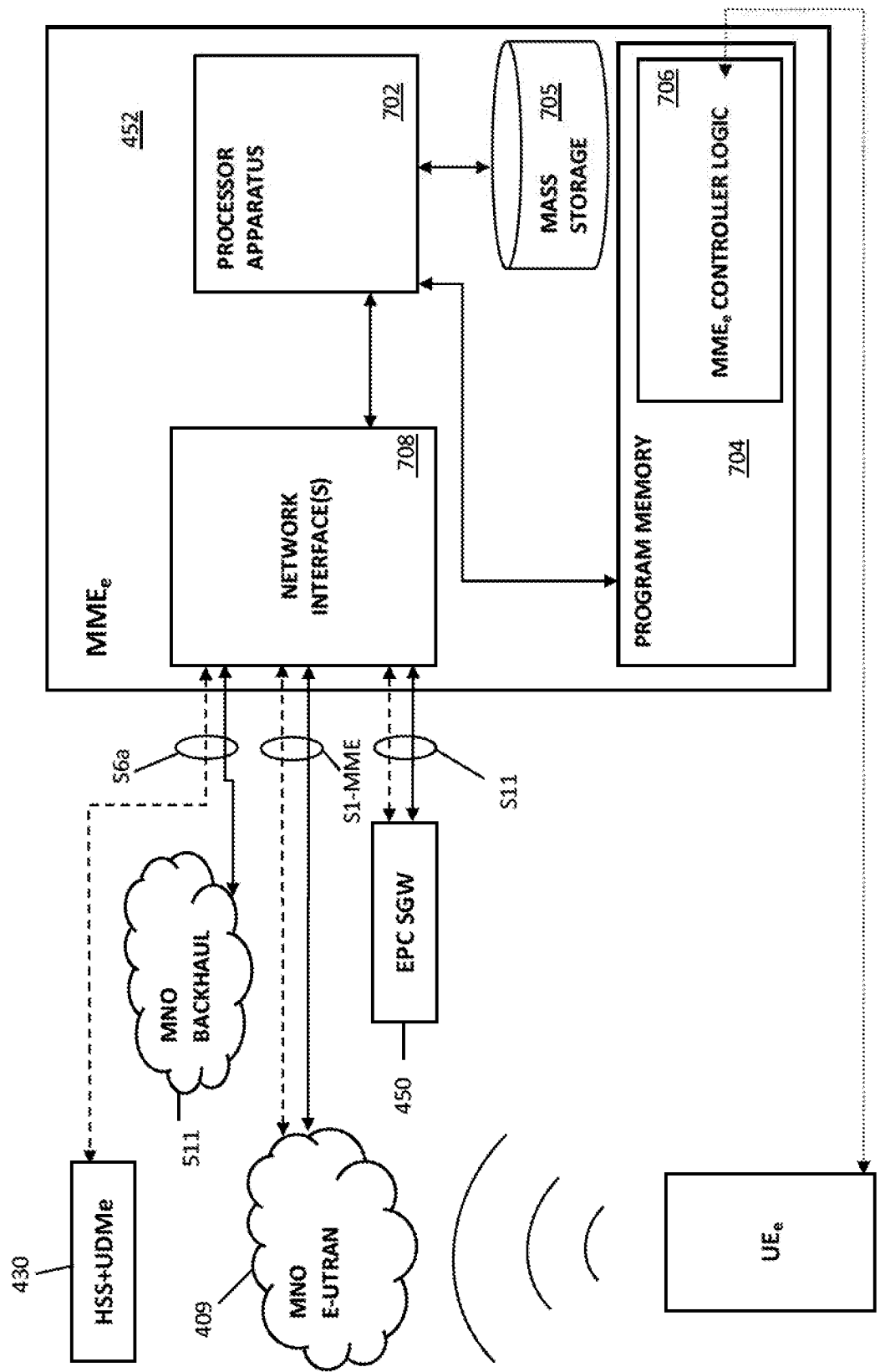
FIG. 7 is a functional block diagram illustrating a first exemplary embodiment of an enhanced MME (Mobility Management Entity), or MME$_e$, apparatus useful with various embodiments of the present disclosure.

FIG. 7 illustrates an exemplary configuration of an enhanced MME (MME$_e$) 452 according to the present disclosure. As shown, the MME$_e$ 452 includes, inter alia, a processor apparatus or subsystem 702, a program memory module 704, mass storage 705, an MME$_e$ Controller Logic module 706, one or more network interfaces 708.

In the exemplary embodiment, the processor 702 may include one or more of a digital signal processor, microprocessor, field-programmable gate array, or plurality of processing components mounted on one or more substrates. The processor 702 may also comprise an internal cache memory, and is in communication with a memory subsystem 704, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 702.

The network interfaces 808 are configured to comply with the relevant standards which the MME$_e$ supports (e.g., 3GPP 4G/4.5G or others as applicable) in the service area of the E-UTRAN 409, including the S6a interface to the HSS+UDM$_e$ 430, S1-MME interface to the E-UTRAN, and the S11 interface to the SGW 450 of the EPC.

The processing apparatus 702 is configured to execute at least one computer program stored in memory 704 (e.g., a non-transitory computer readable storage medium); in the illustrated embodiment, such programs include $MME_e$ controller logic 706, such as to recognize and decode the "moving from 5G" data as part of the EPC attach procedure message (thereby indicating to the $MME_e$ that is should not include an "initial attach" indicator in its transmission to the $HSS+UDM_e$ 430 (see discussion of step 612 of FIG. 6a above), and other logical functions performed by the $MME_e$ as described elsewhere herein. Other embodiments may implement such functionality within dedicated hardware, logic, and/or specialized co-processors (not shown). The MMEe controller logic 706 is in one variant a firmware or software module that, inter alia, communicates with a corresponding $UE_e$ logic portion (i.e., for message exchange and protocol implementation), and/or other upstream or backend entities such as the SGW 450.

In some embodiments, the $MME_e$ logic 706 utilizes memory 704 or other storage 705 configured to temporarily hold a number of data relating to the various UEs (including the inventive $UE_e$'s 402). In other embodiments, application program interfaces (APIs) such as those included in an MNO-provided application or those natively available on the $MME_e$ may also reside in the internal cache or other memory 704.

In one implementation, the MSO subscriber or client database may also optionally include the provisioning status of the particular $UE_e$ that is associated with an MSO subscriber and which is also subscribed to the MNO network (which includes the $MME_e$ 452).

$HSS+UDM_e$ Apparatus—

Figure 8:
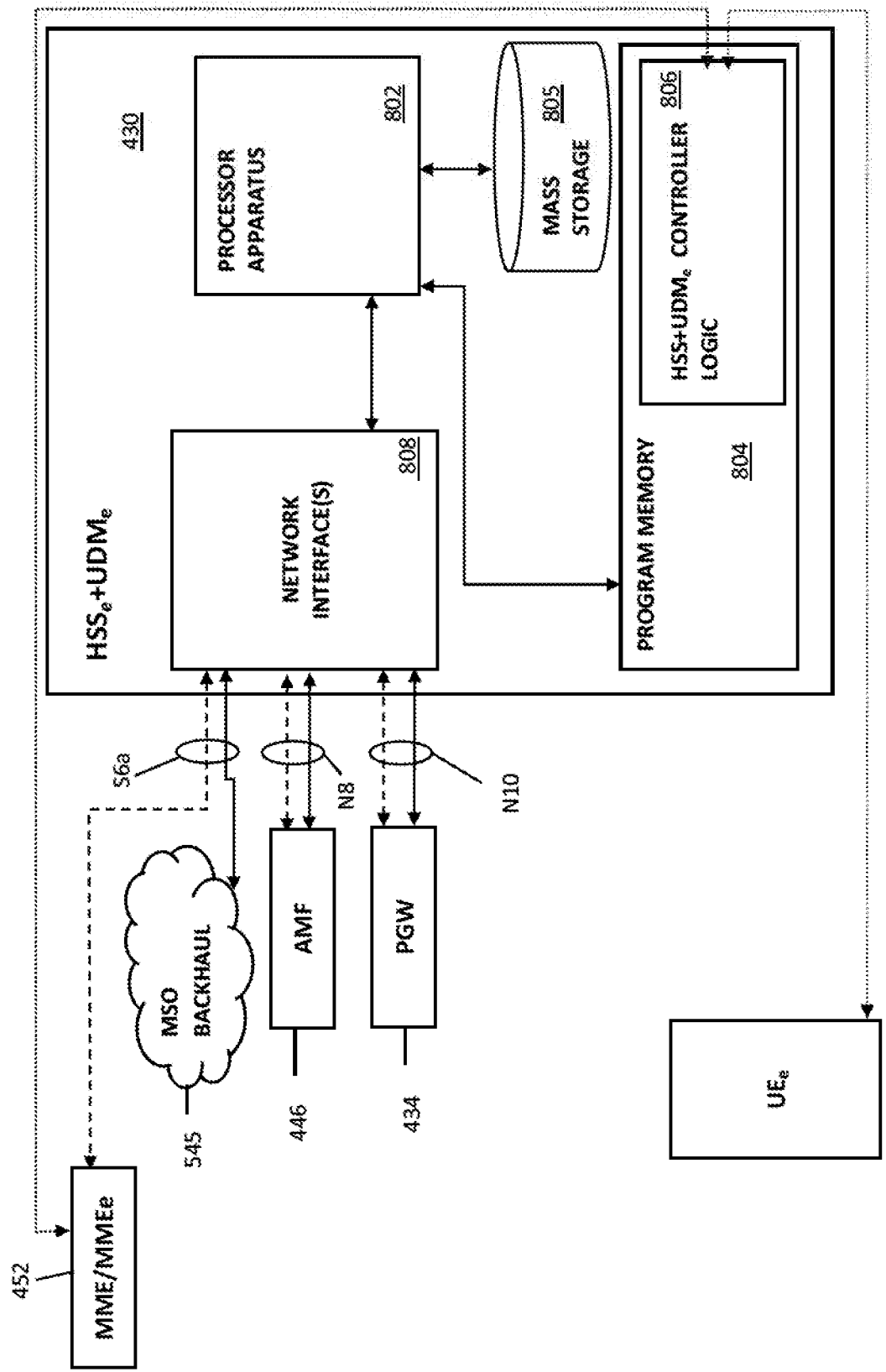
FIG. 8 is a functional block diagram illustrating a first exemplary embodiment of an enhanced HSS (Home Subscriber Service) and UDM (Unified Data Management), or HSS+UDM$_e$, apparatus useful with various embodiments of the present disclosure.

FIG. 8 illustrates an exemplary configuration of an enhanced $HSS+UDM_e$ 430 according to the present disclosure. As shown, the $HSS+UDM_e$ includes, inter alia, a processor apparatus or subsystem 802, a program memory module 804, mass storage 805, HSS (Home Subscriber Server) and UDM (Unified Data Management) enhanced logic 806, one or more network interfaces 808, and one or more RF (e.g., 5G/New Radio) PHY interfaces 809.

In the exemplary embodiment, the processor 802 of the $HSS+UDM_e$ 430 may include one or more of a digital signal processor, microprocessor, field-programmable gate array, or plurality of processing components mounted on one or more substrates. The processor 802 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 802.

The processing apparatus 802 is configured to execute at least one computer program stored in memory 804 (e.g., a non-transitory computer readable storage medium); in the illustrated embodiment, such programs include $HSS+UDM_e$ controller logic 806, such as recognize the $PLMN_2$ (e.g., SPLMN) identity registering the $UE_e$ 402, and accordingly obviate cancellation of the $UE_e$'s registration within the 5GS (see discussion of FIG. 6a above), and other logical functions performed by the $HSS+UDM_e$ as described elsewhere herein. Other embodiments may implement such functionality within dedicated hardware, logic, and/or specialized co-processors (not shown). The $HSS+UDM_e$ controller logic 806 is a firmware or software module that, inter alia, communicates with a corresponding $MME_e$ logic portion (i.e., for message exchange and protocol implementation), and/or other upstream or backend entities such as those within the NG Core in some embodiments. The $HSS+UDM_e$ logic 806 also logically communicates with the $UE_e$ 5G stack (see FIG. 9) as described elsewhere herein.

In some embodiments, the $HSS+UDM_e$ logic 806 utilizes memory 804 or other storage 805 configured to temporarily hold a number of data relating to the various $UE_e$'s (including UDM registration data, SPLMN ID lists, etc.) for the various functions described herein including UEe authentication and registration, SPLMN ID verification, etc.). In other embodiments, application program interfaces (APIs) such as those included in an MSO-provided application or those natively available on the $HSS+UDM_e$ may also reside in the internal cache or other memory 804. Such APIs may include common network protocols or programming languages configured to enable communication with the $HSS+UDM_e$ 430 and other network entities (e.g., via API "calls" to the $HSS+UDM_e$ by MSO network processes tasked with gathering load, configuration, subscriber, SPLMN, or other data).

The $HSS+UDM_e$ may further be configured to directly or indirectly communicate with one or more authentication, authorization, and accounting (AAA) servers of the network, such as via the interface 808 shown in FIG. 8 and the MSO backhaul (e.g., where the $HSS+UDM_e$ is disposed within the MSO infrastructure). The AAA servers, whether locally maintained by the MSO or remotely by e.g., an MNO of the subscriber, are configured to provide services for, e.g., authorization and/or control of network subscribers (including roaming MNO "visitors" to the MSO RAN(s), and/or roaming MSO subscribers visiting an SPLMN of an MNO) for controlling access and enforcing policies, auditing usage, and providing the information necessary to bill for services.

In one exemplary embodiment, the $HSS+UDM_e$ 430 is maintained by the MSO and is configured to utilize a non-public IP address within an IMS/Private Management Network "DMZ" of the MSO network. As a brief aside, so-called DMZs (demilitarized zones) within a network are physical or logical sub-networks that separate an internal LAN, WAN, PAN, or other such network from other untrusted networks, usually the Internet. External-facing servers, resources and services are disposed within the DMZ so they are accessible from the Internet, but the rest of the internal MSO infrastructure remains unreachable or partitioned. This provides an additional layer of security to the internal infrastructure, as it restricts the ability of surreptitious entities or processes to directly access internal MSO servers and data via the untrusted network, such as via a MME or AMF "spoof" or MITM attack whereby an attacker might attempt to hijack one or more functional entities to obtain data from the corresponding $HSS+UDM_e$ (or even $UE_e$'s utilizing the $HSS+UDM_e$).

UEe Apparatus

FIG. 9 illustrates a block diagram of an exemplary embodiment of a $UE_e$ 402 apparatus, useful for operation in accordance with the present disclosure.

In one exemplary embodiment as shown, the $UE_e$ 402 includes, inter alia, a processor apparatus or subsystem 902, a program memory module 904, $UE_e$ logic 906 (here implemented as software or firmware operative to execute on the processor 902), and wireless interfaces 910, 920 for communications with the relevant RANs (e.g., 4G/4.5G E-UTRAN and 5G-NR RAN, respectively). The RF interfaces 910, 920 are each configured to comply with the relevant PHY standards which it supports. The antenna(s) 915, 925 of the $UE_e$ radios may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

In one embodiment, the processor apparatus 902 may include one or more of a digital signal processor, microprocessor, field-programmable gate array, or plurality of processing components mounted on one or more substrates. The processor apparatus 902 may also comprise an internal cache memory. The processing subsystem is in communication with a program memory module or subsystem 904, where the latter may include memory which may comprise, e.g., SRAM, flash and/or SDRAM components. The memory module 904 may implement one or more of direct memory access (DMA) type hardware, so as to facilitate data accesses as is well known in the art. The memory module of the exemplary embodiment contains one or more computer-executable instructions that are executable by the processor apparatus 902. A mass storage device (e.g., HDD or SSD, or NAND/NOR flash or the like) is also provided as shown.

The processor apparatus 902 is configured to execute at least one computer program stored in memory 904 (e.g., the logic of the $UE_e$ including enhanced functions of DRM and multi-RAN (and PLMN) registration and operation, in the form of software or firmware that implements the various functions described herein). Other embodiments may implement such functionality within dedicated hardware, logic, and/or specialized co-processors (not shown).

Also included in the $UE_e$ 402 is a USIM apparatus 927, which is configured to securely store (and provide ancillary processing related to) both the legacy (4G/4.5G) GUTI and the 5G GUTI, which enables the $UE_e$ to register within the two separate networks (e.g., $PLMN_2$ and $PLMN_1$, respectively in FIG. 4a). In one embodiment, the 5G and 4G GUTIs are received by the $UE_e$ 402 pursuant to the registration/attach procedures of FIG. 6a (see steps 604 and 618), and stored within the USIM 927 in respective storage elements thereof (e.g., SE's or cryptographically secure elements).

In some embodiments, the $UE_e$ logic 906 also utilizes memory 904 or other storage 905 configured to temporarily hold a number of data relating to the various EPLMN lists, PLMN associations for the various services/applications such as voice, etc.) for the various functions described herein. In other embodiments, application program interfaces (APIs) such as those included in an MSO-provided application or those natively available on the $UE_e$ may also reside in the internal cache or other memory 904. Such APIs may include common network protocols or programming languages configured to enable communication with the $UE_e$ 402 and other network entities (e.g., via API "calls" to the $UE_e$ by MSO network processes tasked with gathering load, configuration, usage of SPLMNs, or other data). As an aside, a downloadable application or "app" may be available to subscribers of an MSO or cable network (and/or the general public, including MSO "partner" MNO subscribers), where the app allows users to configure their $UE_e$ via the UI to implement enhanced functionality, including data collection and reporting back to the MSO core network so as to enable, inter alia, service/RAN availability when roaming, congestion, or other attributes which may be useful in implementing e.g., the methodologies of FIGS. 6a and 6b discussed above. Application program interfaces (APIs) may be included in MSO-provided applications, installed with other proprietary software that comes prepackaged with the $UE_e$. Alternatively, the relevant MNO may provide its subscribers with the aforementioned functionality (e.g., as a pre-loaded app on the $UE_e$ at distribution, or later via download), or as a firmware update to the $UE_e$ stack conducted OTA.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized mobile device configured for use within multiple mobile network environments, the computerized mobile device comprising:

digital processor apparatus;

first wireless interface apparatus in data communication with the digital processor apparatus and configured for wireless communication with a first radio area network (RAN) utilizing a first wireless access technology;

second wireless interface apparatus in data communication with the digital processor apparatus and configured for wireless communication with a second RAN utilizing a second wireless access technology; and storage apparatus in data communication with the digital processor apparatus and comprising a storage medium, the storage medium comprising at least one computer program, the at least one computer program, configured to, when executed on the digital processor apparatus:

establish data communication with a first network management entity associated with the first RAN, the first network management entity associated with a first network operator and a first mobile network;

establish data communication with a second network management entity associated with the second RAN, the second network management entity associated with a second network operator and a second mobile network; and transmit data indicative of movement of the computerized mobile device between the first and second mobile networks;

wherein the transmitted data is configured to cause the second network management entity to omit particular data in a transmission to a computerized network process to maintain the established data communication with the first network management entity and the established data communication with the second network management entity contemporaneously such that at least a portion of the data communication between the computerized mobile device and the first network management entity temporally overlaps with at least a portion of the data communication between the computerized mobile device and the second network management entity.

2. The computerized mobile device of claim 1, wherein:
the first wireless access technology comprises a 3GPP Long Term Evolution (LTE)-based technology;
the second wireless access technology comprises a 3GPP New Radio (5G-NR)-based technology;
the first mobile network comprises a home public land mobile network (HPLMN) of the computerized mobile device; and
the second mobile network comprises a public land mobile network (PLMN) which the computerized mobile device is visiting.

3. The computerized mobile device of claim 1, wherein the contemporaneous establishment of the data communication with the first network management entity associated with the first RAN and the data communication with the second network management entity associated with the second RAN comprises maintaining at least (i) a first RRC (Radio Resource Control) connection for the data communication with the first network management entity and (ii) a second RRC (Radio Resource Control) connection for the data communication with the second network management entity.

4. The computerized mobile device of claim 1, further comprising:
a subscriber identity module logic in data communication with the data processor apparatus, the subscriber identity module configured to provide data enabling the establishment of the data communication with the first network management entity; and
the same subscriber identity module configured to provide data enabling the establishment of the data communication with the second network management entity.

5. The computerized mobile device of claim 1, further comprising:
the subscriber identity module logic in data communication with the data processor apparatus, the subscriber identity module logic configured to provide data enabling the establishment of the data communication with the first network management entity; and
the same subscriber identity module logic in data communication with the data processor apparatus, the same subscriber identity module logic configured to provide data enabling the establishment of the data communication with the second network management entity.

6. The computerized mobile device of claim 5, wherein the subscriber identity module logic are part of a common Universal Subscriber Identity Module (USIM).

7. The computerized mobile device of claim 5, wherein:
the data enabling the establishment of the data communication with the first network management entity comprises data relating to a first land mobile network (LMN);
the data enabling the establishment of the data communication with the second network management entity comprises data relating to a second land mobile network (LMN).

8. The computerized mobile device of claim 5, wherein:
the computerized mobile device comprises a user equipment (UE);
the first land mobile network (LMN) comprises a visited public land mobile network (VPLMN) for the UE; and
the second land mobile network (LMN) comprises a home public land mobile network (HPLMN) for the UE.

9. The computerized mobile device of claim 1, wherein the first network management entity and the second network management entity are not affiliated or federated.

10. The computerized mobile device of claim 1, wherein:
the first wireless access technology comprises a 3GPP Long Term Evolution (LTE)-based technology;
the second wireless access technology comprises a 3GPP New Radio (5G-NR)-based technology; and
the computerized mobile device is further configured to support DRM (Dual Registration Mode) operation.

11. Computerized network apparatus for use within a wireless network infrastructure, comprising:
a 3GPP HSS+UDM (Home Subscriber Service and User Data Management) entity configured to maintain registration of a UE (user equipment) within both a first mobile network and a second mobile network simultaneously, the first mobile network comprising a 3GPP Long Term Evolution (LTE) network operated by a first network operator, and the second mobile network comprising a 3GPP 5G NR network operated by a second network operator different from the first network operator;
wherein the maintenance of the registration of the UE within both a first mobile network and a second mobile network simultaneously is based on an absence of indicator data in a communication received by the 3GPP HSS+UDM entity.

12. The computerized network apparatus of claim 11, wherein:
the computerized network apparatus comprises computerized logic configured for data communication with both (i) an MME (Mobility Management entity) of the LTE network, and (ii) an AMF (Access and Mobility Management Function) of the 5G NR network; and
the LTE network comprises a first PLMN ID (public land mobile network identifier), and the 5G NR network comprises a second PLMN ID.

13. The computerized network apparatus of claim 11, wherein the absence of the indicator data in the communication received by the 3GPP HSS+UDM entity comprises absence of an "initial attach" indicator in an update location request message sent by the second network operator to the 3GPP HSS+UDM entity.

14. A computerized method of operating a wireless network infrastructure, comprising:
identifying a first registration of a computerized user device within the wireless network infrastructure, the wireless network infrastructure operated by a first network operator;
receiving data relating to a second registration of the computerized user device within a second wireless network infrastructure operated by a second network operator;
evaluating the received data relating to the second registration for prescribed data;

determining that the prescribed data is not present within the received data relating to the second registration; and based at least on the determining, enabling maintenance of both the first registration and the second registration simultaneously.

15. The computerized method of claim 14, wherein:

the identifying comprises data communication with an AMF (Access and Mobility Management Function) of 3GPP 5G NR (Fifth Generation New Radio) network;

the receiving data comprises receiving data from an MME (Mobility Management entity) of a 3GPP LTE (Long Term Evolution) network;

the LTE network comprises a first PLMN ID (public land mobile network identifier);

the 5G NR network comprises a second PLMN ID; and the enabling maintenance of both the first registration and the second registration simultaneously comprises operation of the user device using both the first PLMN ID and the second PLMN ID.

16. Computerized network apparatus for use within a wireless network infrastructure, the computerized network apparatus comprising:

a MME (Mobility Management Entity) process, the MME process configured to recognize one or more prescribed 3rd Generation Partnership Project (3GPP) 5G NR (Fifth Generation New Radio)-based network migration or transition signals generated from one or more 3GPP 5G NR compliant UE (user equipment) to enable simultaneous operation of the one or more 3GPP 5G NR UE associated with first and second distinct land mobile networks (LMNs);

wherein the computerized network apparatus is configured to utilize the 3GPP 5G NR-based network migration or transition signals generated from the one or more 3GPP 5G NR UE to cause non-inclusion of indicator data in a transmission to a network management entity process associated with the first LMN.

17. The computerized network apparatus of claim 16, wherein the computerized network apparatus comprises a 3GPP Long Term Evolution (LTE) Mobility Management Entity (MME) process, and the network management entity process comprises a 3GPP compliant HSS+UDM (Home Subscriber Service and User Data Management) entity.

18. The computerized network apparatus of claim 16, wherein the non-inclusion of indicator data in a transmission to the network management entity process associated with the first LMN results in the network management entity process not cancelling an extant registration of the UE with another 5G NR entity.

19. The computerized network apparatus of claim 18, wherein the computerized network apparatus comprises a 3GPP Long Term Evolution (LTE) Mobility Management Entity (MME) process, the network management entity process comprises a 3GPP compliant HSS+UDM (Home Subscriber Service and User Data Management) entity, and the another 5G NR entity comprises an AMF (Access and Mobility Management Function).

* * * * *